Dec. 2, 1952  S. J. MATOSEC  2,620,421
ROOF WELDING MACHINE
Filed April 28, 1948  16 Sheets-Sheet 1

Inventor.
Stephen J. Matosec.
By Oscar Hochberg. Atty.

Dec. 2, 1952 S. J. MATOSEC 2,620,421
ROOF WELDING MACHINE
Filed April 28, 1948 16 Sheets-Sheet 3
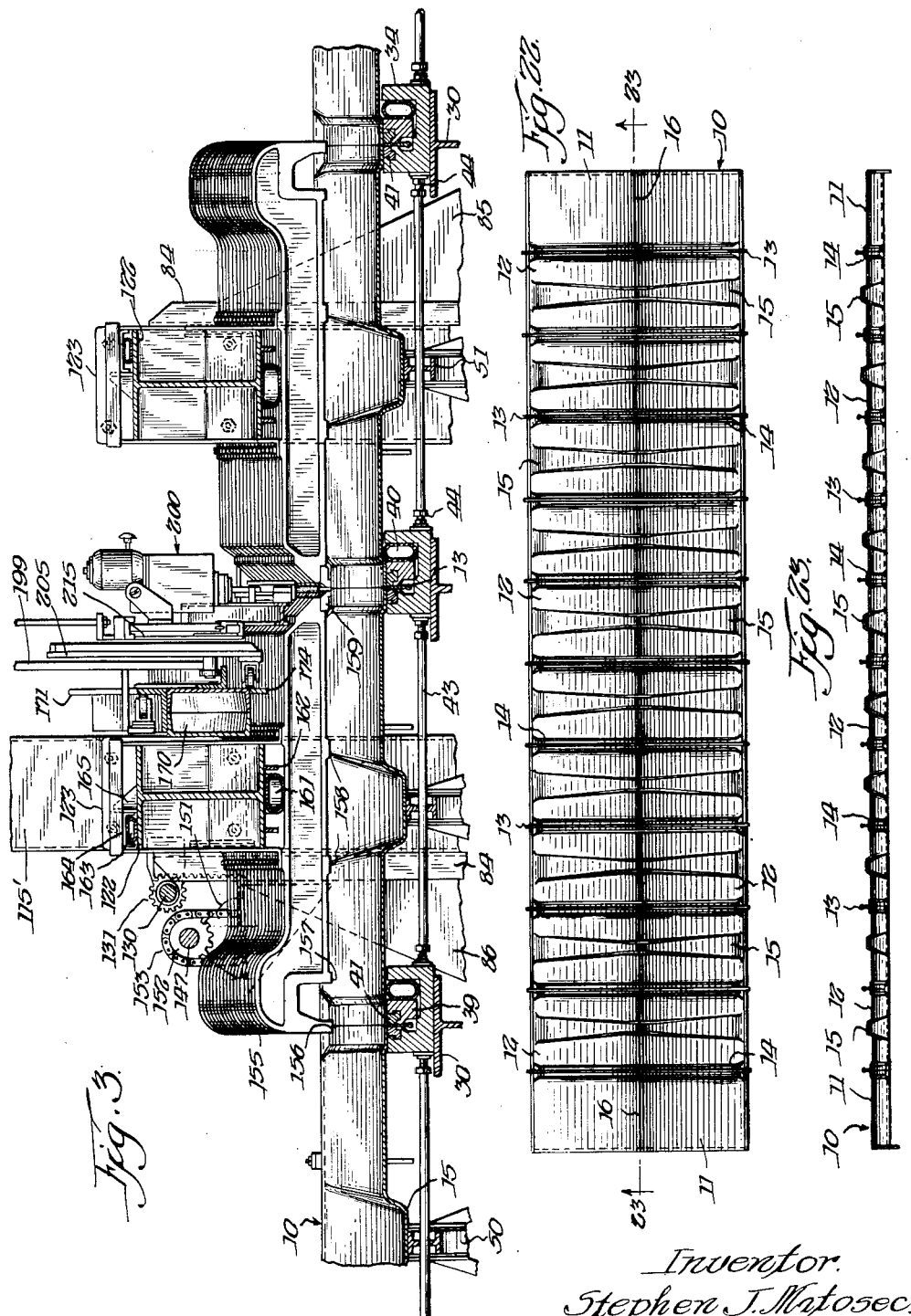
Inventor.
Stephen J. Matosec.
By Oscar Hochburg. Atty.

Dec. 2, 1952 S. J. MATOSEC 2,620,421
ROOF WELDING MACHINE
Filed April 28, 1948 16 Sheets-Sheet 4

Inventor
Stephen J. Matosec.
By Oscar Hochberg. Atty.

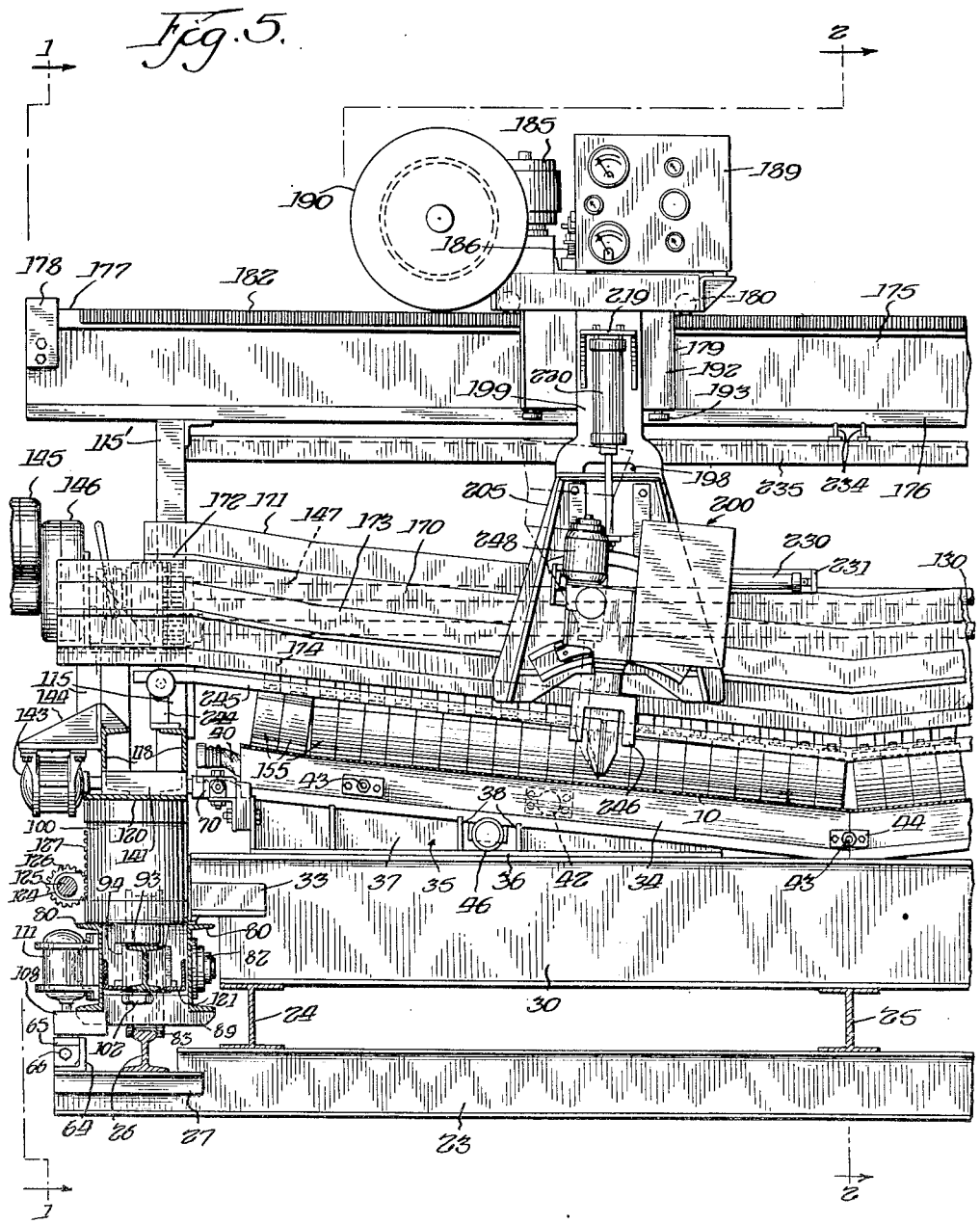

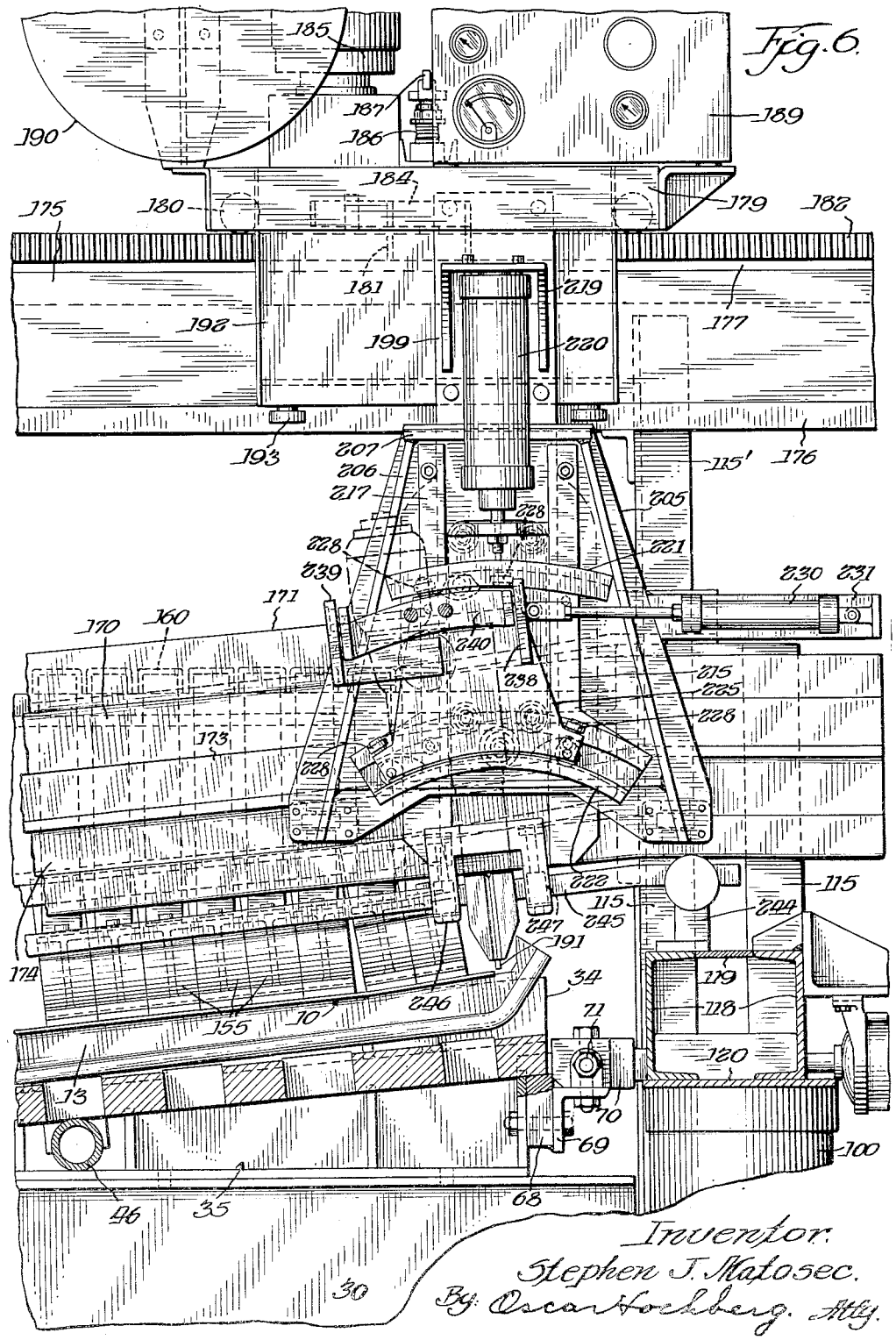

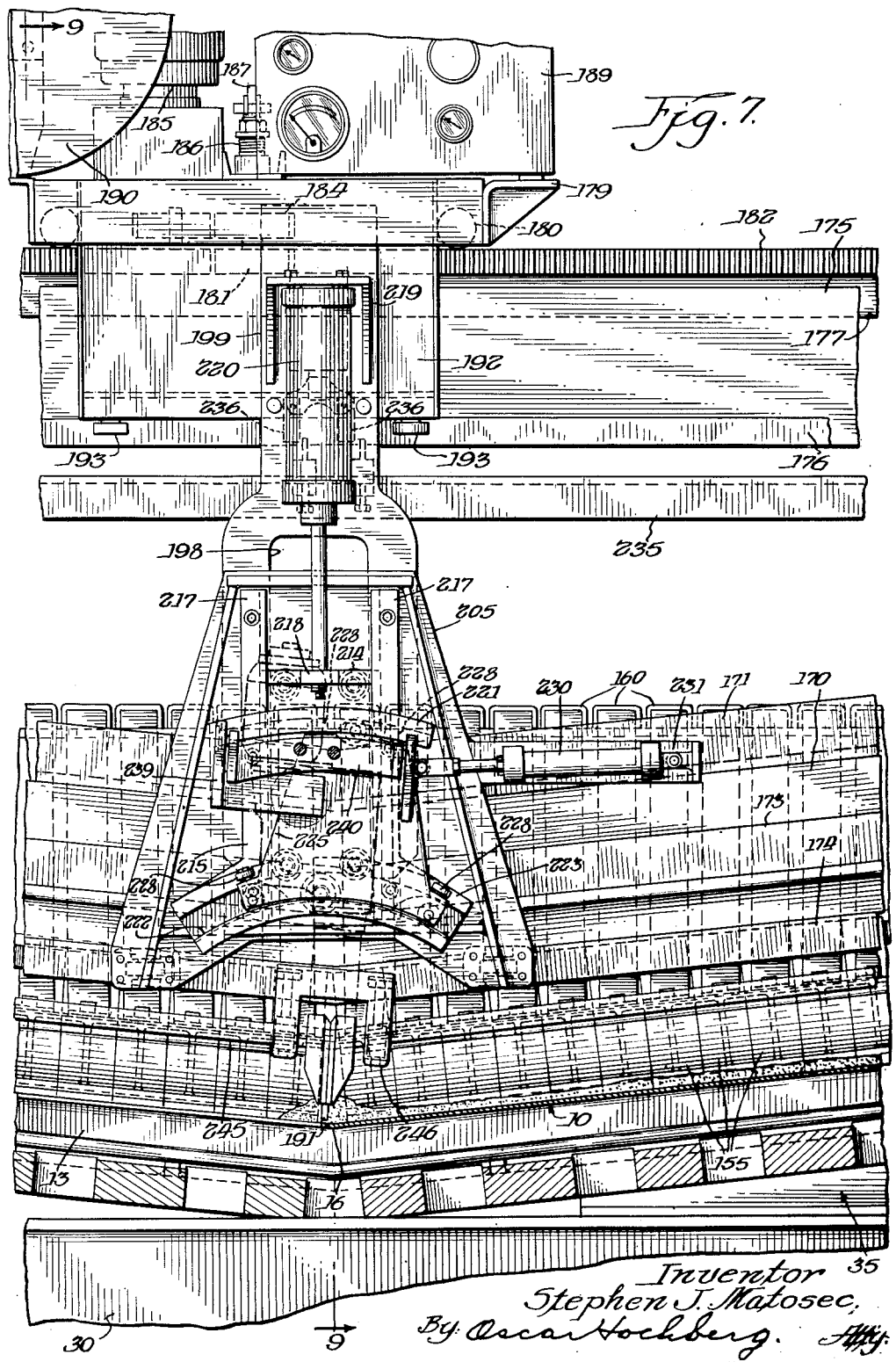

Dec. 2, 1952 S. J. MATOSEC 2,620,421
ROOF WELDING MACHINE
Filed April 28, 1948 16 Sheets-Sheet 8
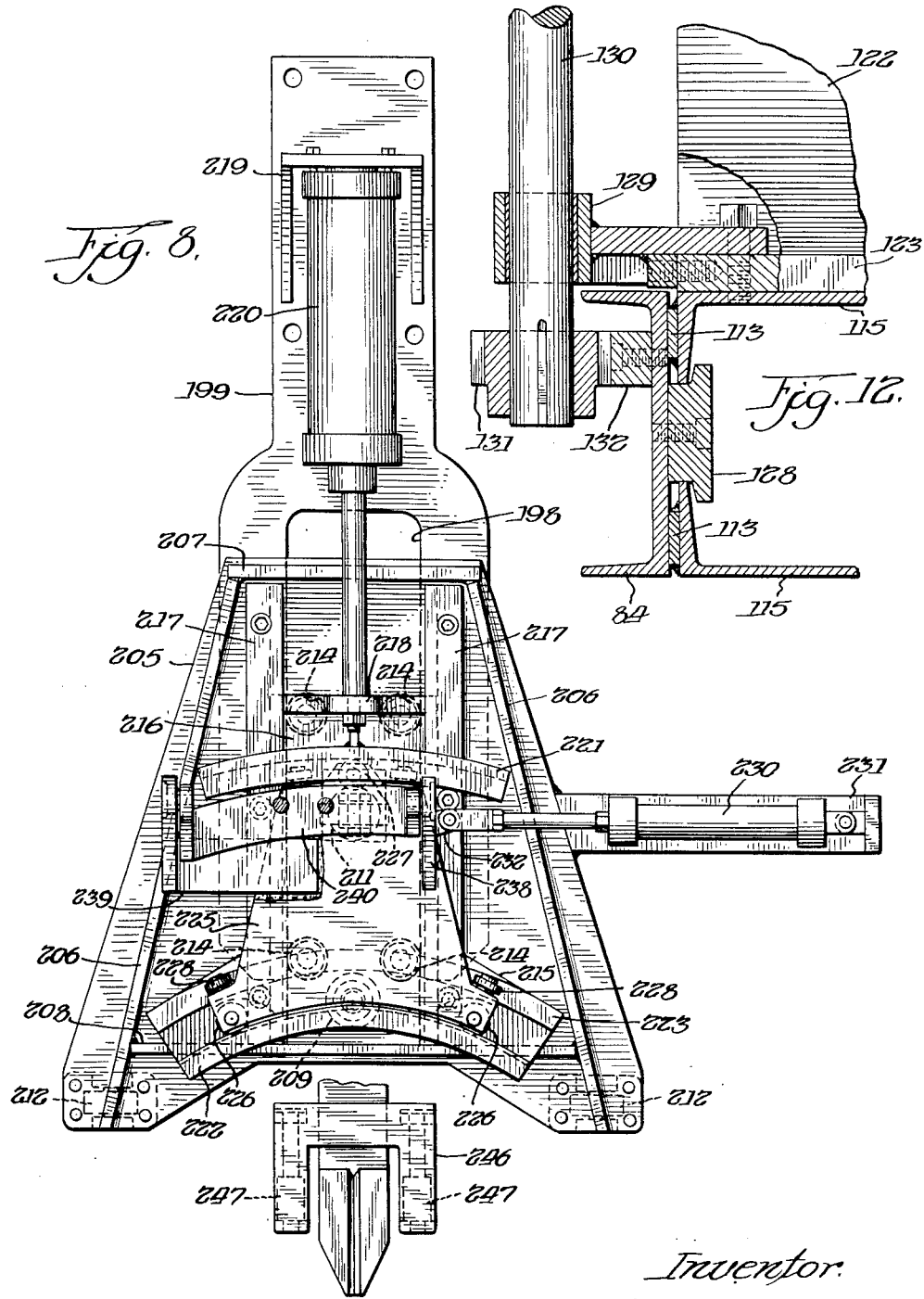
Inventor:
Stephen J. Matosec.
By Oscar Hochberg. Atty.

Dec. 2, 1952 S. J. MATOSEC 2,620,421
ROOF WELDING MACHINE
Filed April 28, 1948 16 Sheets-Sheet 9

Inventor.
Stephen J. Matosec.
By Oscar Hochberg. Atty.

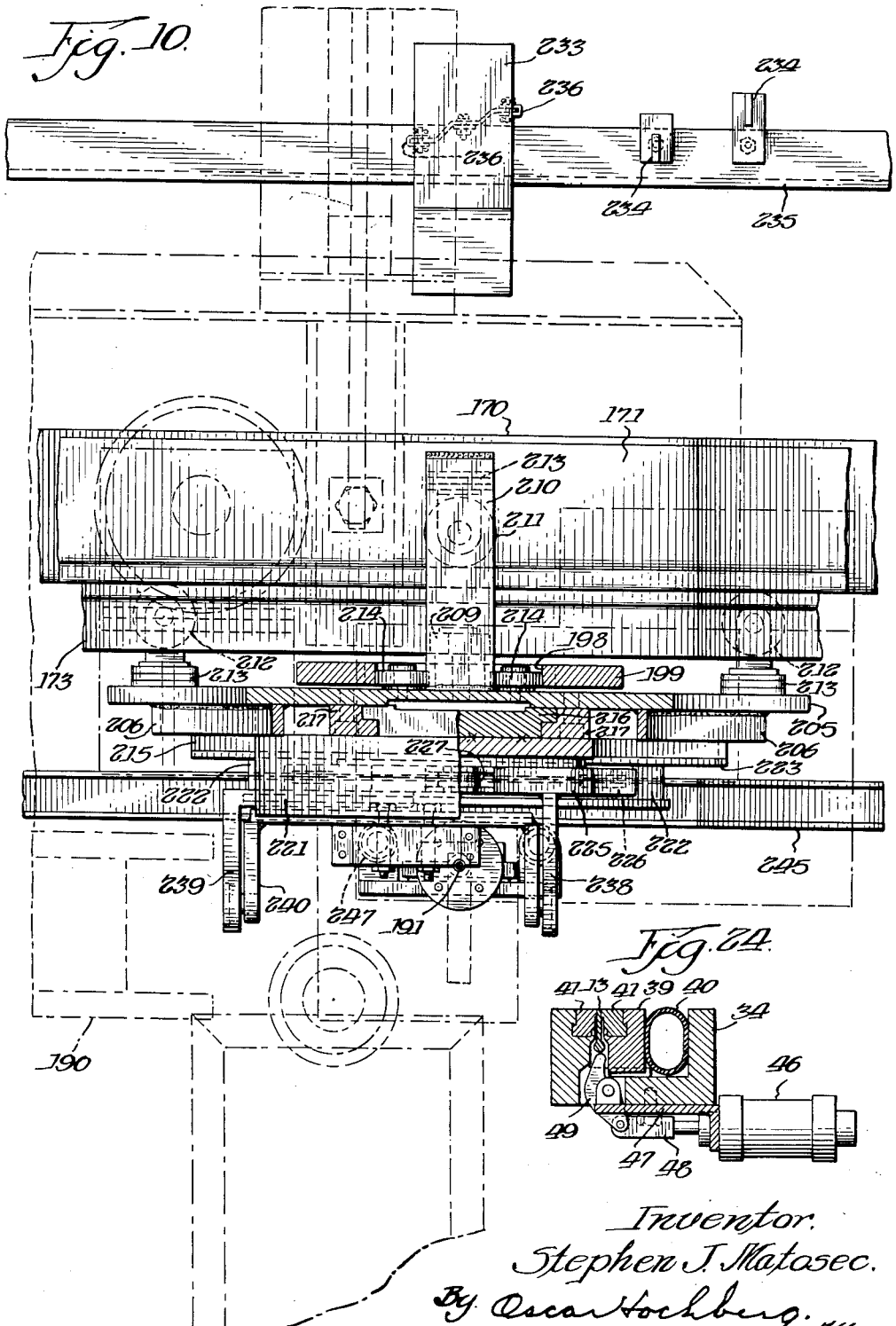

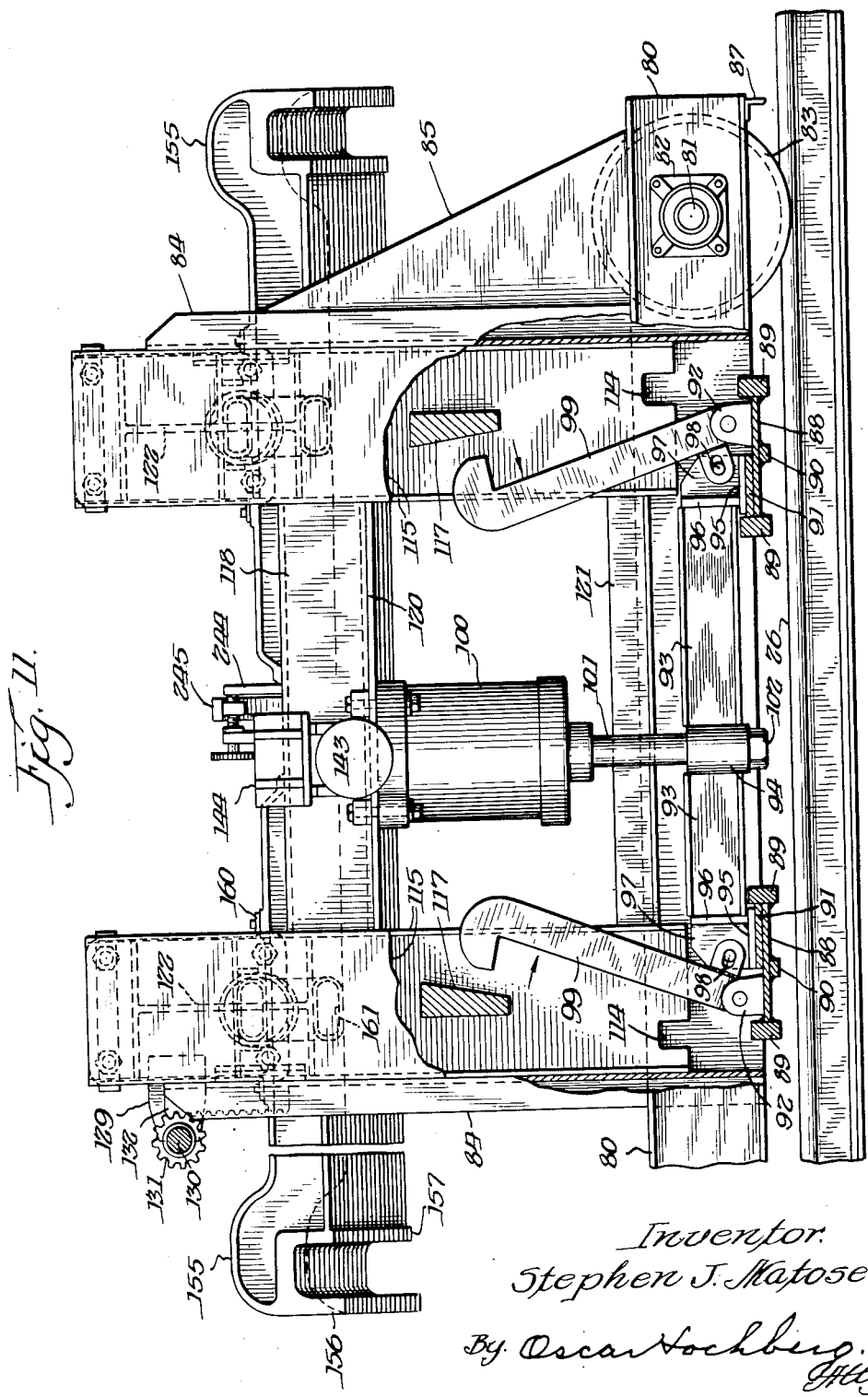

Dec. 2, 1952  S. J. MATOSEC  2,620,421
ROOF WELDING MACHINE
Filed April 28, 1948  16 Sheets-Sheet 12
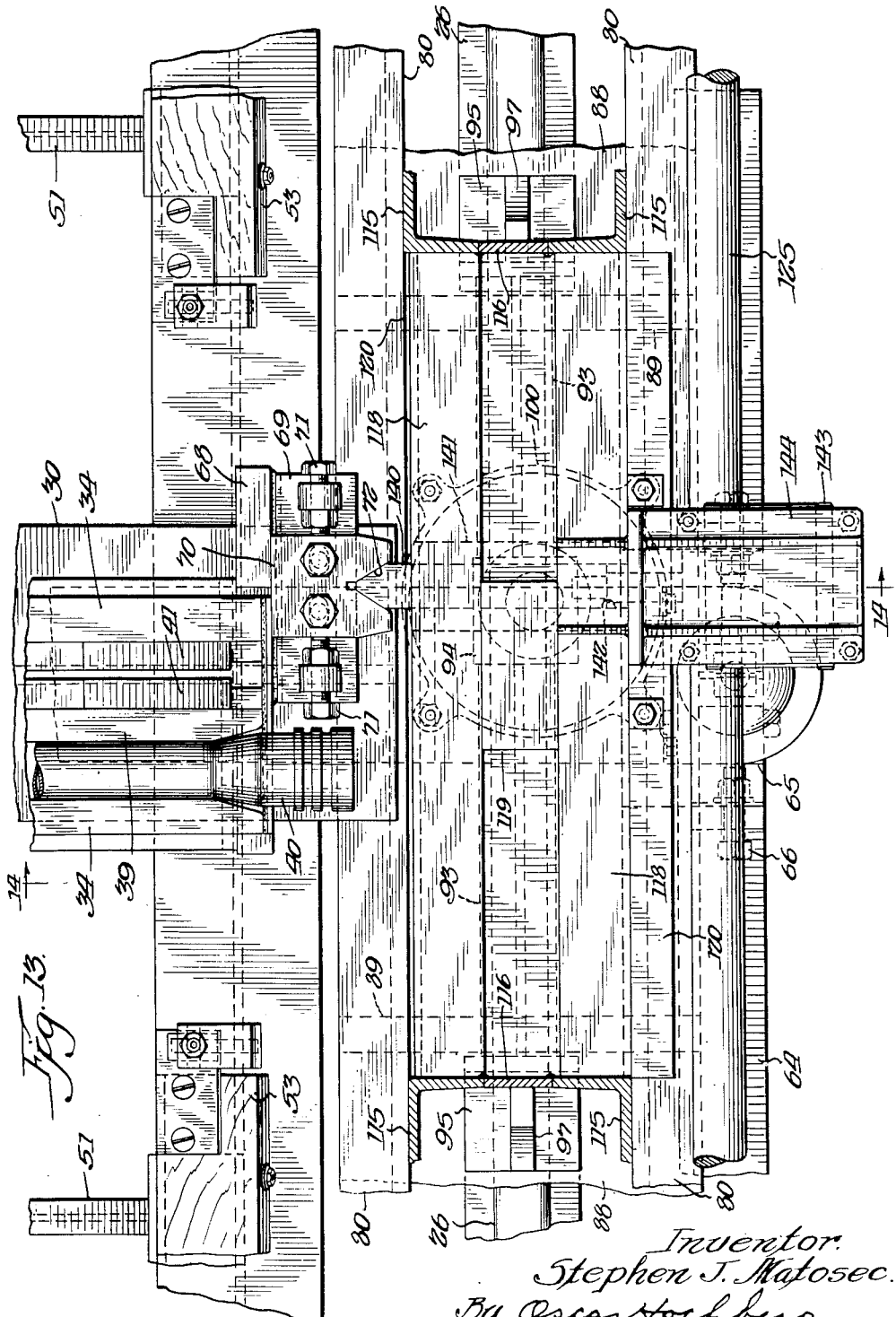
Inventor.
Stephen J. Matosec.
By Oscar Hochburg. Atty.

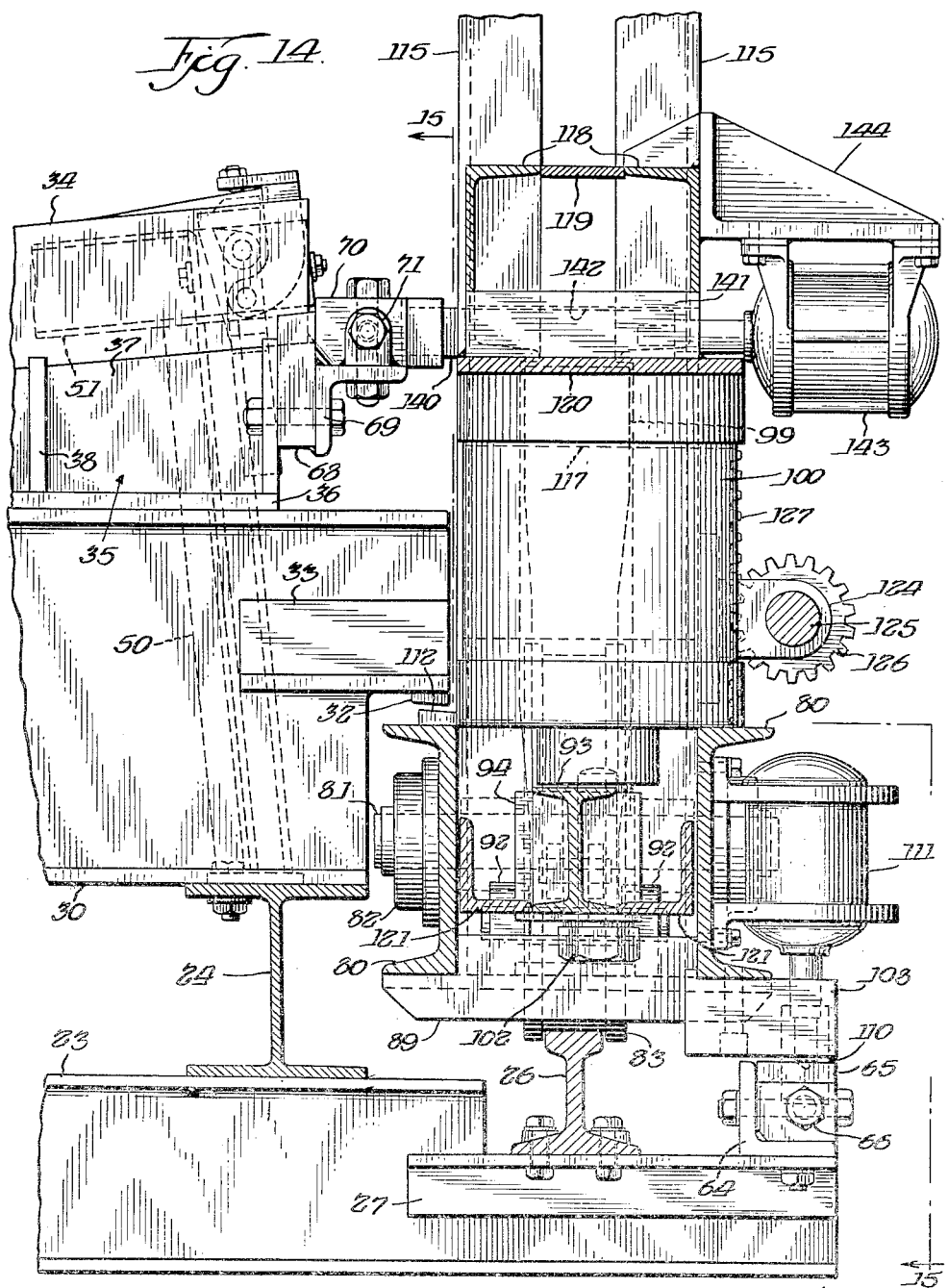

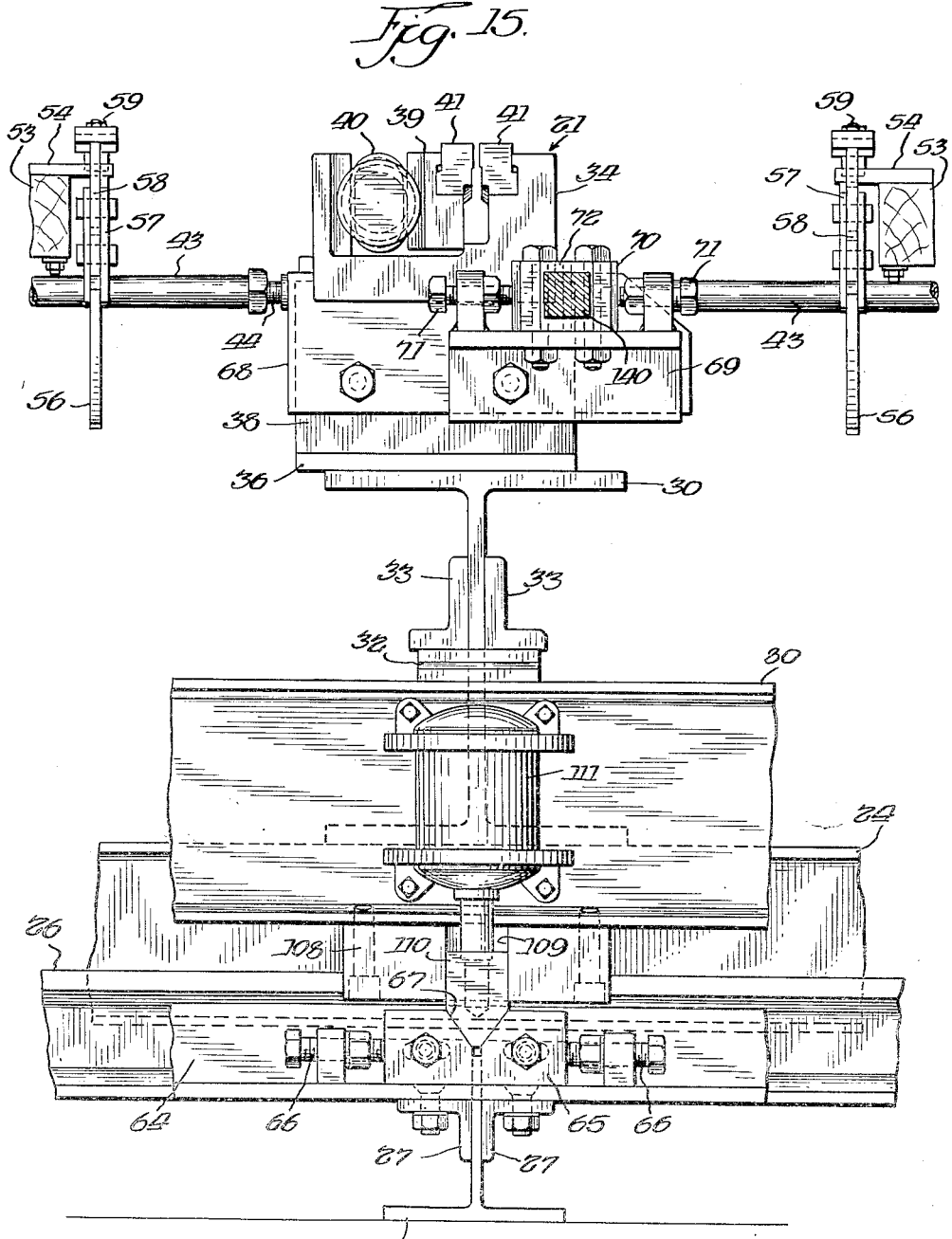

Dec. 2, 1952 S. J. MATOSEC 2,620,421
ROOF WELDING MACHINE
Filed April 28, 1948 16 Sheets-Sheet 15
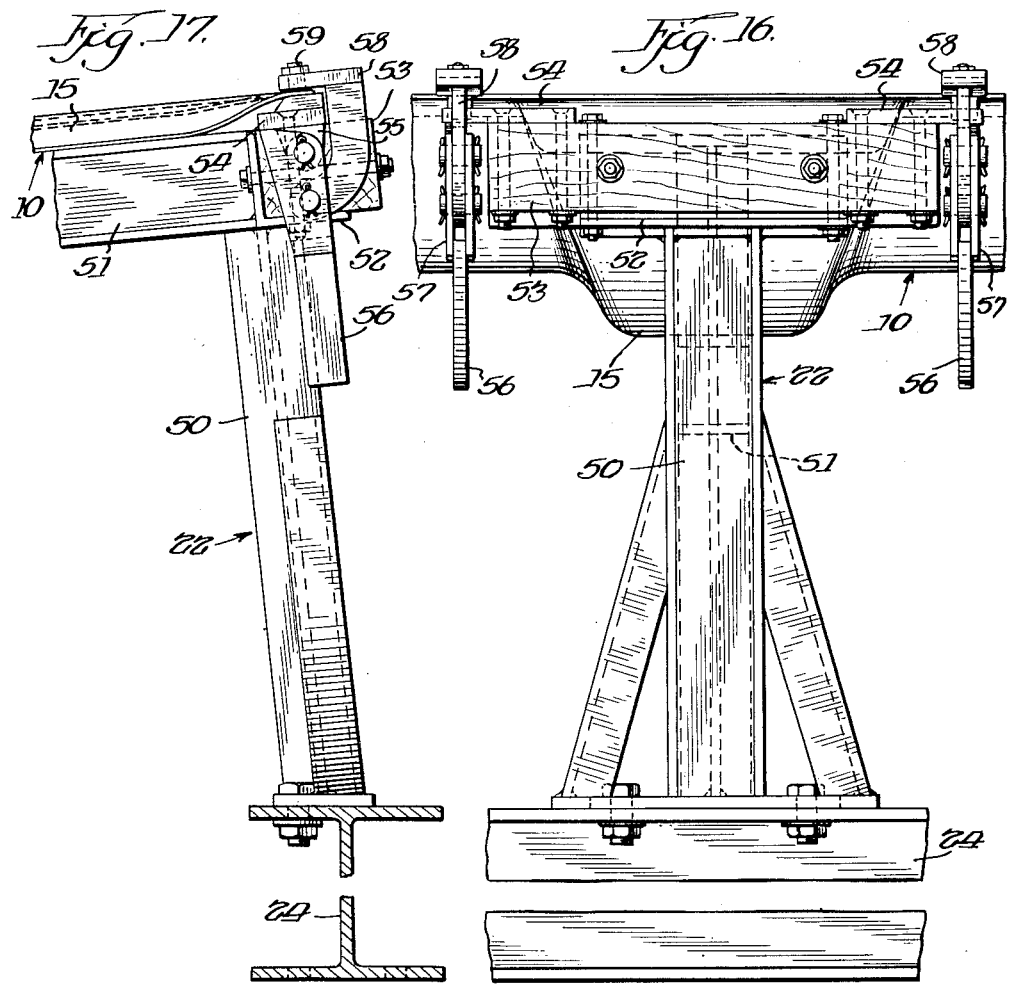
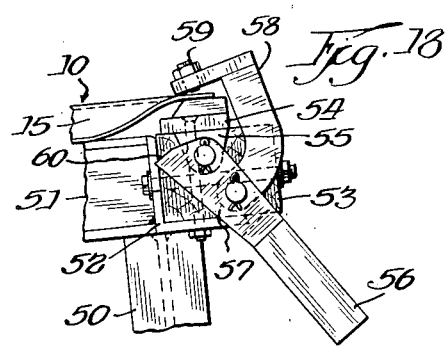
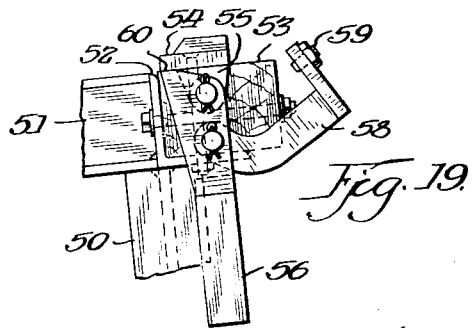
Inventor.
Stephen J. Matosec.
By Oscar Hochberg. Atty.

Dec. 2, 1952 — S. J. MATOSEC — 2,620,421
ROOF WELDING MACHINE
Filed April 28, 1948 — 16 Sheets-Sheet 16
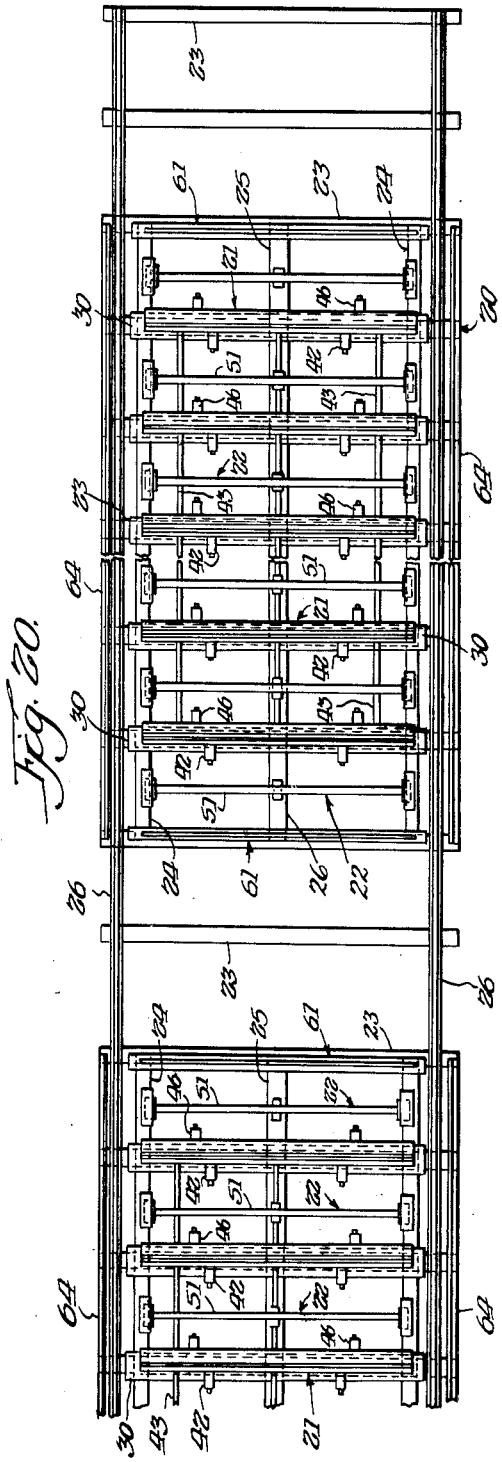
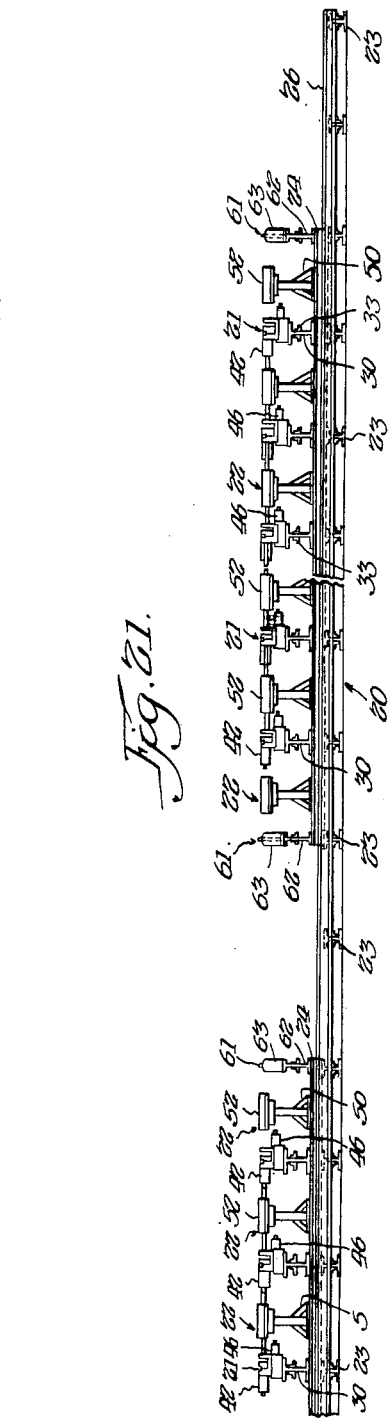
Inventor.
Stephen J. Matosec.
By Oscar Hochberg. Atty.

Patented Dec. 2, 1952

2,620,421

UNITED STATES PATENT OFFICE 2,620,421

ROOF WELDING MACHINE

Stephen J. Matosec, Hammond, Ind., assignor to Pullman-Standard Car Manufacturing Company, Chicago, Ill., a corporation of Delaware Application April 28, 1948, Serial No. 23,783

10 Claims. (Cl. 219—8)

This invention relates to a machine and fixture for production welding of prefabricated roof assemblies for railway box cars, and has for its primary object the provision of a fixture which facilitates the ready assembly of the roof elements into associated relationship for integration by welding and combined with a welding apparatus adapted efficiently and rapidly to perform all of the welding operations necessary to perfect the roof assembly, shiftable to the various welding positions along the roof and designed to follow the roof contour during the actual operation of welding while maintaining alignment with the individual seams to be welded at the respective positions.

An important object of the invention is the provision of a roof assembly fixture having a welding machine shiftable relative thereto for traversing the work, with interlocking indexing devices engageable between the machine and fixture for aligning the machine with the work at various welding positions.

Another important object of the invention is the provision of a welding machine having a traveling welding head mounted for pivotal shifting on an inverted arcuate slide, using the point of weld fusion on the work as the pivot point and shiftable automatically to maintain right angularity with the work.

A further and important object of the invention is the provision of a traveling welding head pivotally mounted on a supporting bracket for movement at right angle to the line of weld and having guide rollers engageable with an adjustable guide surface to maintain alignment of the welding head with the line of weld.

Other and more specific objects of the invention include the provision of air cylinders for automatic positioning of the welding head and for balancing the weight of the head and mounting slide and for removal of the welded roof assembly from the fixture and in the clamp assembly for positioning the clamp members and lifting the clamp assembly off the work; an air operated clutch providing a quick acting release of the driving power, permitting rapid traverse across the full length of the carriage; the floating mounting of copper backing plate supports in the fixture at the welding positions to allow for expansion and eliminate angular distortion from the accumulated heat of welding, thus to maintain uniform welding conditions; and non-magnetic spacer members between respective cradles of the fixture and non-magnetic clamp members engaging the roof, both to eliminate stray magnetic pull otherwise affecting the welding operations.

The foregoing and still further objects of the invention are attained by the constructions and arrangements illustrated in the accompanying drawings, in which Fig. 1 is a general side elevational view of the welding machine in operative relation to the roof assembly fixture, having a roof to be welded clamped in position on the fixture and showing the general arrangement of the machine, including the wheeled carriage for travel relative to the fixture on guide rails and supporting a gantry movable vertically with respect thereto carrying a welding head reciprocable across the machine in directions at right angles to the direction of travel of the machine;

Fig. 2 is a generally central longitudinal sectional view taken on the line 2—2 of Fig. 5, showing a roof clamped in position on the assembly fixture with the non-magnetic clamps of the welding machine engaging adjoining roof sheets at opposite sides of the welding head to press the sheets against the carline member to which they are being welded and against copper backing members at respective sides of the weld position, and illustrating the cross beams for supporting the respective sets of clamps with air pressure members beneath and above each beam for applying pressure to the clamps and releasing them;

Fig. 3 is a fragmentary view similar to Fig. 2 but showing the non-magnetic clamp members and welding head in released position, raised above the roof sheets after the weld has been completed, ready for the machine to move to the next welding position;

Fig. 5 is a general cross sectional view of the machine taken on the line 5—5 of Fig. 1 showing the machine bridging the jig fixture, with a roof in place and the welding head in the process of traversing the width of the roof to form a seam uniting adjoining roof sheets, with an underlying carline member clamped in the supporting cradle;

Figure 6:
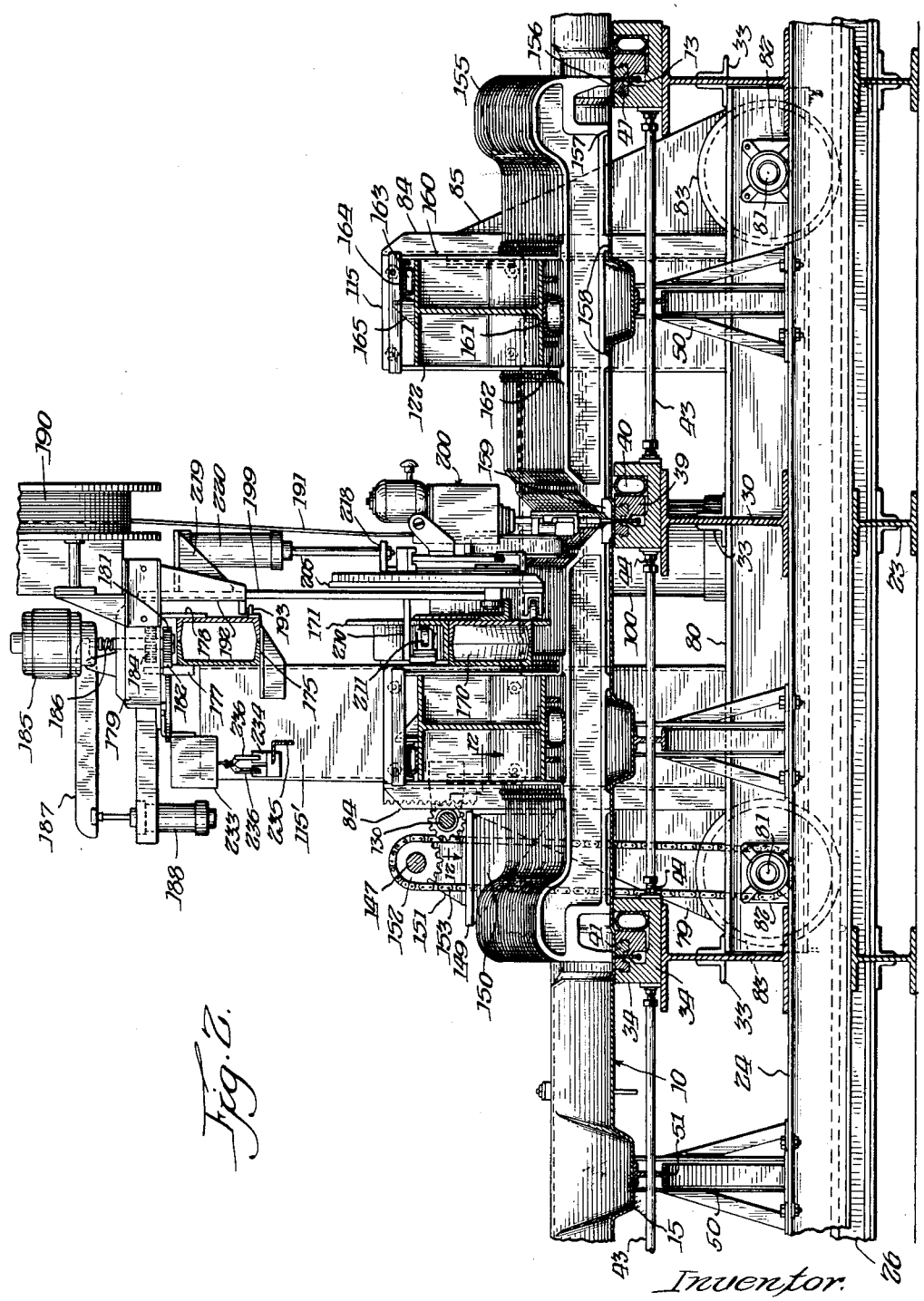
Figure 9:
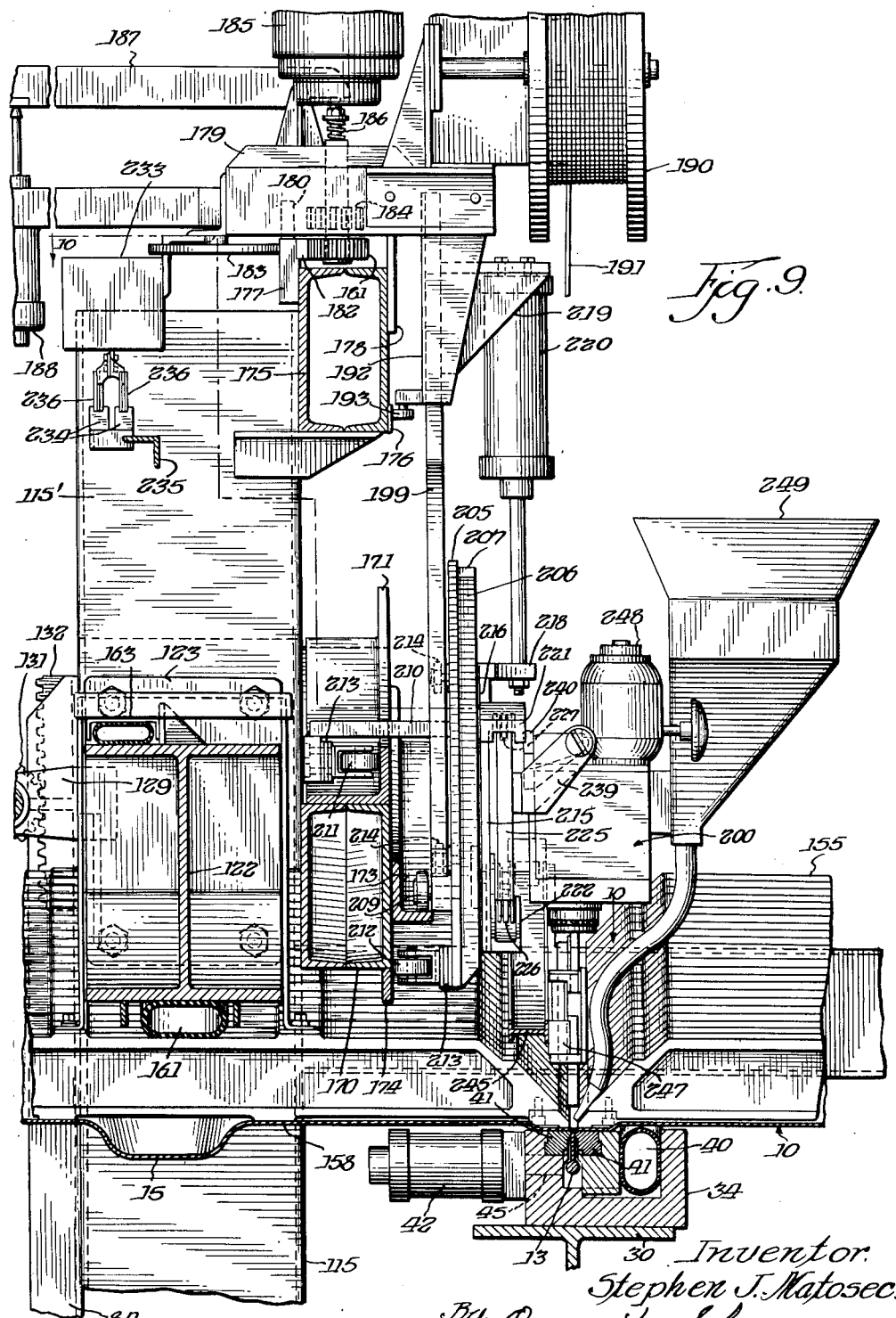

Fig. 6 is a fragmentary detail view to larger scale showing the mounting arrangement for the welding head adapted to traverse the machine from side to side, and whereby the head may be tilted in accordance with the work to maintain the head at right angles thereto, with the double acting air cylinder for tilting the head in the arcuate slide and the air cylinder for raising and lowering the welding head and mounting slide with respect to the work and for balancing the weight thereof. In this figure the welding head is indicated as tilted to one extreme position, as at the beginning of a weld seam at one side of the roof, while Fig. 7, which is a view similar to Fig. 6, indicates the welding head tilted to the other extreme position, which action occurs as the welding head progresses past the ridge position of the roof and without interruption of welding speed, and at which position the welding head has also been lowered into the relatively deep ridge portion by the action of the balancing cylinder. Both this figure and the preceding one indicate the rack and pinion driving mechanism for the welding head at the upper portion and the motor for actuating them;

Fig. 8 also is a detail view to larger scale illustrating the yoke in which the arcuate slide mounting the welding head is vertically movable and upon which the balancing cylinder is mounted, and showing the pivotally mounted double acting air cylinder for actuating the arcuate slide and with rollers disposed between all relatively movable surfaces;

Fig. 9 is a detail longitudinal sectional view taken on the line 9—9 of Fig. 7, showing a fragmentary portion similar to that shown in Figs. 2 and 3 but to larger scale, and illustrating the manner of supporting the non-magnetic roof sheet clamping bars on one of the cross beams of the gantry but with the bars pressing adjoining roof sheets against the supporting fixture under air pressure applied between the under side of the supporting beam and the upper side of the bars, and showing the mounting of the welding head on the arcuate slide plate for tilting vertically, movable in the yoke member depending from the driving mechanism above, which pushes the welding head along the seam being welded as driven by the rack and pinion mechanism;

Fig. 10 is a detail plan sectional view taken in stepped planes, as indicated on the line 10—10 of Fig. 9, and showing the arrangement of the various parts comprising the mounting for the welding head, including the yoke member pushing the assembly along, the assembly movable vertically relative thereto, and including the arcuate slide mounting parts movable relatively in lateral directions and showing the pivotal mounting for the welding head and the guide beam for pivoting the head in accordance with the weld seam to be followed, and also showing, at the upper portion of the view, the tripping mechanism for actuating switch mechanism to energize a solenoid which operates a four-way valve to operate the double acting air cylinder controlling the tilting of the arcuate slide;

Fig. 11 is a generally side elevational view of the welding machine carriage with portions broken away to reveal the locking mechanism between the vertically movable portion of the machine and the wheeled carriage, with the locks released and the movable elements raised, and showing the air cylinder for actuating the locks and raising and lowering the movable portions of the structure;

Fig. 12 is a detail horizontal sectional view taken on the line 12—12 of Fig. 2 through one of the interlocking connections between the vertically movable portion of the structure and the relatively fixed upright of the carriage, and showing the rack and pinion gear connection between the upright and an equalizer bar mounted in bearings on the movable portion for assuring equalization in the vertical movement at opposite sides of the machine;

Fig. 13 is a fragmentary detail plan view of a portion of the welding machine carriage and the roof assembly fixture, illustrating the top wedge lock indexing connection therebetween for exactly positioning the machine relative to the fixture in alignment with the seam to be welded;

Fig. 14 is a fragmentary detail cross sectional view of the indexing arrangement, taken on the line 14—14 of Fig. 13 and showing the lower general indexing connection between the machine and fixture, operable vertically, and the upper precision indexing connection therebetween, operable horizontally, both actuated by air pressure by means of separate cylinders individual to the respective devices;

Fig. 15 also is illustrative of the wedge lock indexing devices and comprises a side elevational view of the welding machine carriage and roof assembly fixture partially in section, taken on the line 15—15 of Fig. 14, showing the relation of the upper indexing device with respect to the roof carline clamping mechanism of the fixture for exact positioning of the welding mechanism thereover, and showing the lower indexing device interlocked under pressure of the air cylinder thereabove;

Fig. 16 is a detail end elevational view to larger scale of one of the roof sheets supporting cradles of which the roof assembly fixture is comprised and which are disposed in alternating relation to carline clamping cradles throughout the full length of the fixture, and having quick acting clamp members facilitating the setting up of the roof assembly for welding.

Fig. 17 is a view of the cradle portion shown in Fig. 16 but at right angles thereto, and showing a roof sheet clamped in position thereon with the roof sheet inverted and the corrugation thereof supported on the cross member of the cradle, and illustrating the clamp member in fully clamped position;

Fig. 18 is a detail view of the roof sheet clamping device shown in Fig. 17, but illustrating the clamp in partially released position, while Fig. 19 shows the clamp in fully released position and open, which permits removal of the roof after welding has been completed, and the application of new roof sheets for further welding operations;

Figs. 20 and 21 illustrate a plan view and side elevational view respectively of the roof assembly fixture, with portions broken away, and showing the arrangement involving base supports with the different types of cradles secured thereto and consisting of the type shown in Figs. 16 and 17 for supporting the intermediate portion of each roof sheet and alternating with the type best illustrated in Fig. 15, which is adapted to clamp the individual carline members of the roof structure beneath adjoining edges of adjacent roof sheets for welding, the latter type of cradles being separated by non-magnetic spacer members extending through the respectively intervening cradles of the other type, and having rails extending continuously at respectively opposite sides of the fixture for accommodation of the welding machine traveling relative thereto;

Figs. 22 and 23 comprise a general plan view and a central longitudinal sectional view respectively, the latter being taken on the line 23—23 of Fig. 22, showing a completed railway box car roof assembly of a type which may be welded by means of the equipment of this invention and showing the individual roof sheets making up the assembly, each having a central corrugation and offset opposite edges, with bulb carline members disposed edgewise at the adjoining edges of the roof sheets and integrated therewith by the welding operations performed by this equipment; and Fig. 24, appearing on sheet 10 of the drawings, is a detail cross sectional view through one of the carline clamping cradles, showing the mechanism for releasing the clamp.

The invention affords an arrangement for production welding of railway car roofs including an assembly fixture having the capacity for setting up two roofs thereon for welding, whereby one roof structure may be in the process of welding while the other is being set up to provide for continuous operation of a welding machine associated with the fixture, adapted to travel relative thereto to successive welding positions with which it is indexed, for more or less automatic progression along the roofs being assembled. The fixture includes fast, easily actuated clamps for manual operation on certain of the roof sheet supporting cradles, and air pressure actuated clamping devices on others adapted to secure certain of the roof components in fixed relation to others for welding, both to facilitate the setting up of roof assemblies on the fixture, while the welding machine, extending over the fixture, travels progressively to successive welding positions with which it is indexed and applies pressure to the roof sheets at immediately opposite sides of each seam to be welded, whereupon a reciprocable welding head traverses the full width of the roof to form a seam integrating adjoining roof sheets with a carline member disposed therebeneath in the fixture. The welding head is guided precisely in alignment with the joint between the sheets while traveling in a position at all times perpendicular to the plane of the sheet surfaces being welded, and follows the pitch of the roof to the ridge position where it tilts automatically to maintain right angles with the roof sheets. When the weld is completed, the pressure on the roof sheets is removed, the indexing devices released, and the machine moves to the next position.

In the drawings, referring to Figs. 22 and 23 on sheet 3, a railway box car roof 10 is illustrated of a type as covered in copending application Serial No. 707,609 filed November 4, 1946 for Railway Car Roof, now Patent No. 2,519,079, issued August 15, 1950, which may be assembled and welded upon and by the assembly fixture and welding machine herein. The roof assembly is comprised of flanged end roof sheet panels 11 at opposite ends of the roof and a plurality of intermediate roof sheet panels 12 and bulb carline members 13 disposed at the joints between respectively adjoining sheets. All of the roof panels 11 and 12 have upwardly offset marginal portions 14 at the meeting edges of the adjoining sheets, where the respective carlines are disposed edgewise in upstanding relation on the top side of the roof directly at the joint thus formed. The end roof sheets 11 are plain, while the intermediate sheets each have an upwardly pressed central corrugation 15 formed therein and extending continuously across the full width of the roof. The roof structure is formed with a central longitudinal ridge 16, upon opposite sides of which the roof sheets slope toward the respective sides.

The various components comprising the roof assembly may be set up for automatic welding on the roof assembly jig fixture 20 illustrated in Figs. 20 and 21 on sheet 16. The fixture comprises a plurality of cradles 21 and 22 upon which the roof sheets and carlines may be positioned and secured for the welding operations. Transverse beams 23, extending full width of the fixture, provide base members beneath certain of the cradles and support longitudinal beams 24 upon which all of the cradles are directly supported. The beams 23 are disposed at regular intervals throughout the length of the fixture which is constructed in a multiple accommodating two roof assemblies spaced apart, and wherein the beams 24 extend only in the area of the roof jig portions. An intermediate longitudinal beam 25 parallels the beams 24 and is coextensive therewithin in the respective jig areas. The base of the fixture as a whole is of greater length than the combined jigs and the space therebetween, to provide for the wheeled support of a welding machine operating in association with the fixture.

The transverse beams 23 extend beyond the respective beams 24 and support continuous longitudinal rails 26 disposed adjacent opposite ends thereof and extending along respective sides of the fixture for the support of a welding machine bridging the fixture and operating relative thereto throughout the total length of the fixture. Angle brackets 27 are disposed at opposite sides of the web of the extended end portions of the beam 23 to provide wide bearing supports for the rails 26. The rails are supported throughout their length by the beams 23, including those areas beyond the ends of the fixture and in the space between the jigs. As shown in Figs. 20 and 21, the fixture is illustrated with the jig portion at the right hand side having a portion broken out for condensation, and only a fragmentary portion of the jig at the left is illustrated for the same reason. The space between the jigs and that beyond the jig at the right hand end (which is duplicated at the extreme left end—not shown) is for the accommodation of the welding machine in performing welding operations adjacent opposite ends of the respective roof assemblies.

The cradle assemblies 21 each include a rigid supporting beam 30 extending continuously across the fixture and mounted upon and secured to the longitudinal beams 24 and 25, and which, as best illustrated in Fig. 14, has an upper portion 31 at respectively opposite ends extending beyond the respective beams 24 to provide an interlocking stop 32 overlying a portion of the welding machine frame, as more fully hereinafter will appear. The stops 32 are each backed up by reinforcing angle brackets 33 disposed at opposite sides of the web of the beam 30. On its upper surface, the beam 30 supports a clamping arrangement for a roof carline member, including a cradle member 34 shaped to the pitch of the roof at opposite sides of the ridge and supported in cradle base structures 35 disposed at respectively opposite sides of the ridge position to maintain the slope of the cradle.

The roof 10 is assembled in the jig fixture in an inverted position so that the ridge position represents the lowest point of the cradle, which thence slopes upwardly toward the respectively opposite sides. The base structures 35 each comprise a base plate 36 resting upon the beam 30 and an upright web 37 sloped to the pitch of the roof and braced by gusset plates 38 which also serve as saddle-like supports for the cradle 34. The cradle comprises a generally channel-shaped member 34 mounted in the base structures with the open side disposed upwardly and extending continuously from side to side, but in two parts, with a joint at the center or ridge position. A separate, relatively movable member 39, coextensive with the cradle, is mounted in the channel-shaped structure in spaced relation to one of the upright flanges thereof and movable in opposed relation to the other upright flange. An expansible and collapsible air hose 40, closed at both ends and operatively connected with air pressure operating means, is disposed between the movable member 39 and the first flange, to propel the movable member toward the other flange. The movable member and the opposing flange are shaped to receive and support copper back-up bars 41 in their respectively opposing faces, which are designed to clamp the respective carline members 13 therebetween in position relative to the roof sheets for welding and back up the carlines and roof sheets supported thereon during the welding operation.

The air hose 40, under pressure expands to propel and maintain the member 39 in forward position, clamping a carline member between the copper backing bars, and is collapsed to release the clamping engagement with the carline by means of air pressure operated push-back cylinders 46. The push-back cylinders 46 are disposed in pairs and are adapted to push the member 39 back toward the first flange of the cradle to collapse the hose 40 in moving the member 39 to release position. The air cylinders, as best shown in Fig. 24 on sheet 10, are each secured to the underside of the cradle 34 by means of a bracket 47 and are disposed to the same side of the cradle as said first flange, but the plunger rod 48 of the cylinder engages a lever 49 pivotally mounted intermediate its ends in the bracket and which in turn engages the member 39 at a point below the carline 13 to reverse the direction of force of the cylinder and push the member in the direction necessary to collapse the air hose 40 against the first flange in order to release the clamping action of the cradle on the carline and open the cradle for removal of the roof assembly. Other air cylinders 42 at the opposite side of the cradles 34 from the cylinders 46 are adapted to release the roof assembly from engagement with the cradles. Air cylinders 42 are mounted in pairs externally of the other upright flange of the cradle 34, and have plungers 45 extending through the flange and engaging the carline member, when operated, to press the carline and the roof assembly from contact with such other flange and the overlying shoulder to release the roof assembly from the fixture. The cradle members 21 are separated by non-magnetic spacer bars 43 which are of aluminum and have adjustable connections 44 at respectively opposite ends with the cradles 34 and extend through the cradles 22 disposed between the cradle assemblies 21.

The cradles 22 comprise mere rests for the roof sheets, with attached quick-acting clamps for releasably securing the roof sheets in welding position, and are disposed in alternating relation to the cradles 21. As best shown in Figs. 16 and 17, the cradles 22 include upright supporting structures 50 at respectively opposite ends, secured to the longitudinal beams 24 of the base or table structure and having a roof supporting beam 51 shaped to the pitch of the roof and extending from one upright across the full width of the fixture to the other upright. A central strut (not shown) braces the beam 51 at the ridge position and is secured to the intermediate beam 25. In practice, the roof supporting beam 51 of the cradle 22 is disposed immediately beneath the corrugation 15 of each roof sheet panel to provide a support for the sheet intermediate its width, and extending across the full width of the roof.

As shown in Figs. 16–19, the cradles 22 are each provided with angle members 52 at respectively opposite ends, extending in opposite directions from the beam 51 at right angles thereto and supporting non-metallic blocks 53 secured thereto which are of greater length longitudinally of the fixture than the angle members. Bracket plates 54 are secured at respectively opposite ends of the block 53 outside the area of the angle member 52 to the projecting end portions of the block and out of metallic contact with the angle member, and extending beyond the ends of the block with a depending lug 55 outwardly of each end of the block. Each of these bracket plates is equipped with an operating handle 56 having a jaw portion 57 pivotally connected with the depending lug 55 for actuating a clamp 58 pivotally connected in the jaw portion of the handle beneath the connection to the anchor lug in the locked position of the handle. The clamp 58 has an adjustable bearing 59 for fitting the clamp to proper engagement with the roof sheet panel mounted on the cradle. This clamp arrangement provides an easily operated, quick acting clamp adapted readily to secure the individual roof sheets on the cradles for welding or to release the completed roof assembly from the fixture. Upon placement of each roof panel in the cradle, it may be secured in welding position merely by throwing the clamps 58 over the edges of the roof sheet and pulling the handles 56 downwardly, which lock on or beyond dead center to provide locking means holding each roof sheet at spaced points on each side, and when it is desired to release the completed roof, it is necessary merely to pull the actuating handles to release the clamps from engagement with the roof. In Fig. 17, a roof sheet is shown fully clamped in position on the fixture for welding. Fig. 18 illustrates the releasing action of pulling the handle 56 upwardly to disengage the clamp 58 from the roof sheet, and Fig. 19 shows the clamp fully disengaged and the roof sheet removed from the fixture. The clamp is provided with a shoulder 60 on the jaw portion 57 adapted to engage the under surface of the plate 54 to prevent movement of the handle 56 beyond locking position.

In the setting up of a roof assembly on the jig fixture for welding in actual practice, the carline members 13 first are placed in the cradles 21 and clamped between the copper backing bars 41, with the edge of the carline flush with the top surfaces of the backing bars, as shown in Figs. 2, 3, 9 and 24. The roof sheets 10 then are placed on the fixture, with the corrugations 15 each resting upon the respective cradles 22 directly supported upon the beam 51, and the adjoining edges of respectively adjacent sheets disposed in alignment directly over the edge of the carline member and supported on the copper backing bars whereby to provide a joint integrating the roof sheets and carline by the formation of a welded seam directly at this juncture. All of the carline members are placed in the cradles 21 and clamped in position by the application of air pressure, whereas the individual roof sheets are set up on the cradles 21 and 22 and manually clamped in position by the clamp fixtures on the cradles 22 prior to the welding operation. The end cradles 61 on each of the jig fixtures for supporting the end roof sheet panels 11 and shown only in Figs. 20 and 21, comprise merely flat plates shaped to the ridge contour of the roof and standing on edge on an underlying transverse beam 62 mounted upon the longitudinals 24 and 25 and braced in this upright position by gussets 63.

As shown in Figs. 13–15, the roof assembly fixture 20 is provided with index stops adapted progressively to position the welding machine, hereinafter to be described, relative to the fixture in alignment with the respective seams to be welded. For general positioning of the machine relative to the fixture at each weld location, the fixture is equipped with a set of lower index stops disposed at intervals corresponding to the carline spacing or width of the roof sheets throughout the length of the assembly jig portions of the fixture, and is provided with a set of upper index stops for exact positioning of the machine and precise alignment of the welding apparatus with respect to the roof seam to be welded. The lower stops are all mounted upon a continuous angle member 64 coextensive with the respective jig portions and arranged one at each side of the jig portions of the fixture, since the index stops are operable at both sides of the fixture. The angle is supported upon and secured to the projecting ends of the beams 23, including the angle brackets 27. The stops, as best illustrated in Fig. 15, each comprise a metal block 65 bolted to the angle members through slotted openings for longitudinal adjustment by means of threaded adjusting devices 66 disposed at opposite ends of each block. The stop block 65 is adapted to be engaged vertically by a V-shaped wedge block on the welding machine carriage, as more fully hereinafter will be described, and for this purpose is provided with a V-shaped opening 67 in its upper surface.

The upper index stops are mounted individually, directly upon the respective cradles 21, for precision adjustment relative to the welding positions. As best illustrated in Figs. 14 and 15, a heavy plate 68 is bolted directly to the respective ends of each cradle base structure 35 and extending beyond one side thereof. This heavy plate has an angle member 69 integrally secured thereto by welding and disposed largely to one side of the plate, including the portion extending beyond the cradle, as seen in Fig. 15. The angle member forms a shelf-like bracket on the heavy mounting plate for supporting a stop block 70 which is secured thereto through slotted openings for longitudinal adjustment obtained by means of the threaded adjusting members 71 at each side of the block. The upper stop blocks are designed to be engaged horizontally by a V-shaped wedge block reciprocatingly mounted on the welding machine carriage for alternate engagement with successive stop blocks, also as more fully hereinafter will be described. A V-shaped opening 72 (Fig. 13) is provided in the face of the stop block for reception of the wedge block during operation, and the back of the stop block finds bearing against the face of the plate 68, as seen from Fig. 13, under thrust exerted by the wedge block.

The fixture 20 is designed for cooperative association with a welding machine operating relative thereto in performing the various welding operations necessary to the integration of the roof sheet panels assembled on the fixture, and which bridges the fixture in the form of a gantry operating on wheels, running on the rails 26. The welding machine includes power driving mechanism for propelling it relative to the fixture, and contains parts movable vertically relative to the fixture and adapted to apply hold-down pressure to the roof sheets being welded during the welding operation.

Figure 1:
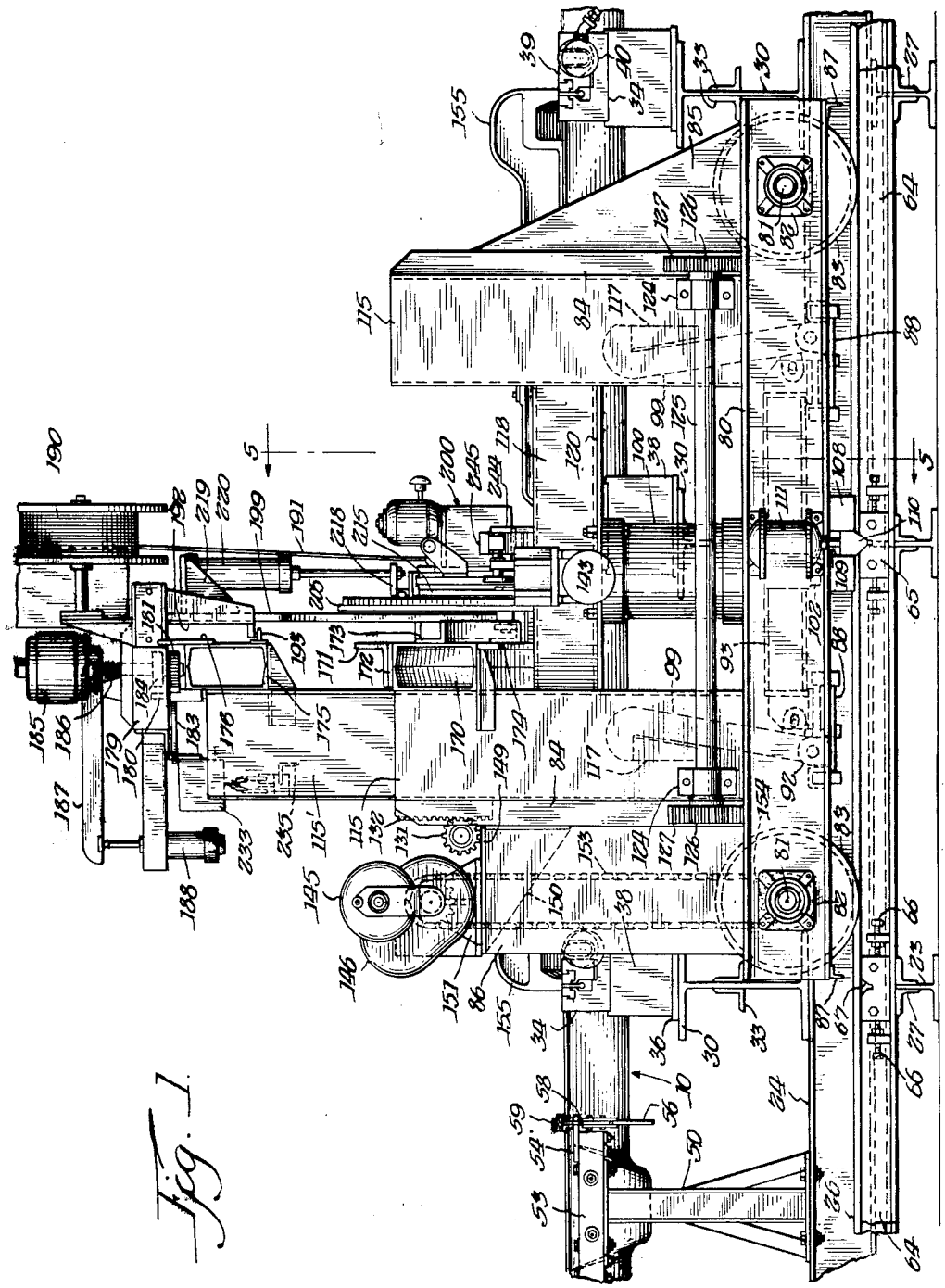

As best shown in Figs. 1, 2 and 11, the wheeled carriage, by means of which the machine is propelled, includes a pair of base channel frame members 80 arranged in spaced back-to-back relation at each side of the machine. These members have axles 81 extending therethrough, mounted in bearings 82 on the outer faces of the channels, and mounting wheels 83 supporting the base frames adjacent opposite ends of each from the rails 26. Upright channel members 84 are disposed between the base channel members 80, just inside the wheels, and are spaced apart, with their backs in opposed relation, for a purpose hereinafter to appear, and their respective flange portions between the base channels are welded thereto to provide an integral assembly. Gusset plates 85 brace the upright channel members with respect to the base frame members at the right hand side of the carriage, as shown in the drawings, and are disposed between the outermost flange of each of the uprights and the associated base member, and secured by welding. The channel members 84, at the other end of the carriage, are braced by a plate 86 on one side and by a gusset plate 79 on the other side, as best indicated in Figs. 1 and 2, and which also are disposed between the outermost flange of each upright and the corresponding base frame member and secured by welding, whereby to provide an integral carriage assembly at each side of the jig fixture having spaced uprights for the accommodation and guidance of vertically movable frame portions.

The base frame channels 80 of each carriage are spaced apart by the uprights 84 disposed therebetween and are connected outside of the wheels at respective ends of the carriages by angle members 87, while base plate assemblies 88 connect the channels 80 in the area between the uprights. As best shown in Fig. 11, these base plate assemblies are each comprised of a flat plate 88 and heavy end cross pieces 89 shaped to fit between the channels 80 and extend beneath the outwardly extending lower flanges, with intermediate cross piece 90 at the underside reinforcing the plate therebetween. A plate 91 on the upper surface of each plate 88 provides spaced bearing pads for a spreader bar, presently to be described, and an upstanding jaw 92 is provided on each of the plates for a pivotally connected locking hook associated with the spreader bar. All of the parts of the base plate assemblies described are integrally secured by welding, and in practice the respective assemblies are bolted to the lower flanges of the base frame channels in spaced relation such as to receive feet provided on the spreader bar on said bearing pads 91.

The spreader bar referred to comprises an assembled welded structure disposed within each carriage for a purpose hereinafter to appear. The spreader bar is comprised of a pair of I-beam sections 93 separated intermediate their ends by a connecting block 94 of metal and to which they are welded to provide an integral continuous beam structure. At each end of the beam a foot is provided for supporting engagement with the bearing pads 91 on the base plates. These feet each comprise a horizontal bearing plate 95, an upright brace 96 secured to the end of the respective I-beam section 93, and a reinforcing rib 97 between the bearing plate and brace, all integrated by welding to provide a unitary structure with the spreader bar. The spreader bar in each carriage, at respectively opposite sides of the machine, is operatively connected at each end by means of a pin and slot connection 98 to an upstanding elongated locking hook 99 pivotally mounted in the respective jaws 92 on the base plates 88 so that a pair of such hooks is actuated at each side of the machine by the respective spreader bars. The spreader bars are each connected to a vertically operating air cylinder 100 at respective sides of the machine by means of piston rod 101 attached to the connecting block 94 through the medium of a bolt 102 entered from the bottom and by means of which the locking hooks are operated during certain phases of operation of the machine.

The carriage frames 80 travel relatively to the jig fixture on the rails 26 and carry indexing stops for association with the respective stop blocks 65 on the fixture at each side, to stop and lock the carriage against movement relative to the jig. For this purpose, a heavy metal guide block 108 (Figs. 1, 4, 5, 14 and 15) is bolted to the underside of the bottom flange on the outer channel member 80 at each side of the machine, and is provided with an opening 109 in its outer face for receiving a wedge block 110 which is reciprocable vertically through the opening for interlocking engagement with the stop block 65 on the fixture. The wedge block 110 is projected into engagement with the block 65 and retracted therefrom by means of an air cylinder 111 disposed for operation in a vertical direction and attached to the outer face of the web of the channel member. The inside channel member 80 at each side of the machine is provided with bearing pads 112 disposed in spaced relation on top of the upper flange at respectively opposite ends and corresponding to the spacing of the beams 30 on the jig fixture for operative cooperation with the overlying stops 32 on such beams to prevent the carriage from raising off the rails under welding pressure.

A frame structure for the welding machine is mounted in the carriages for relative vertical movement and comprises the sole connecting means between the carriages across the jig fixture. The vertically movable frame structure is comprised of four vertical columns of rigid box construction disposed in juxtaposition with respect to the four uprights 84 on the carriages, and connected across the fixture by heavy beams disposed between pairs of columns at opposite sides of the machine and by box section beams disposed between pairs of columns spaced apart longitudinally of the machine at each side. The columns each comprise a pair of channels 115 disposed in planes at right angles to that of the associated upright 84, and arranged in spaced relation, with the flanges facing toward each other and connected at vertically spaced intervals by plates 116 welded edgewise therebetween (see Fig. 13) to provide a unitary column structure. A massive lock bar 117 (Fig. 11) also connects the two channels of each column, extending between and integrally connected with the webs of the channel members by welding, and is adapted for cooperative association with the respective locking hooks mounted on the carriages to provide a positive interlock between the column members and carriages against relative vertical movement during certain phases of operation.

The columns extend downwardly between the base frame channel members 89 of each carriage in closely confined relationship transversely and have bearing engagement with the respectively associated uprights 84 for confinement longitudinally and guided vertical movement relative thereto. Openings 114 in the webs of the channels 115 at the bottom are provided for clearance over the end cross members 89 of the base plate assemblies 88 when the columns are in their lower position. The columns at each side of the machine are spaced apart and integrally connected by a box-like beam structure disposed substantially at the level of the jig fixture and comprised of a pair of channel members 118 (Figs. 11 and 14) disposed in facing relation, with the flanges extending toward each other and the outer channel having its back surface flush with the back surfaces of the associated column channel members 115, while the inside channel member is disposed with the edges of its flanges flush with the edges of the flanges of the associated column channel members, and all integrally secured by welding. The upper flanges of the channels 118 are integrally connected together at a point intermediate the columns by a plate 119 disposed edgewise therebetween and secured by welding, while the bottom flanges are connected by a bottom cover plate 120 extending full length between the column members and of greater width than the transverse dimension of the beam comprised of the channels 118, with its inner edge flush with the back surfaces of the column member 115 at the inside and its outer edge projecting substantially beyond the outer faces of the beam and column members for attachment of the air cylinder 100, which is secured thereto by bolts. At the outer side, the bolts attaching the air cylinder pass only through the plate 120, but at the inside they pass also through the lower flange of the inner channel member 118. Thus the force of the cylinder is applied directly to the horizontal beam 118 connecting the vertical columns 115. The columns also are connected by angle members 121 extending between and welded to the respective channels 115 adjacent their lower ends in the area disposed between the carriage frame members 80 at opposite sides of the spreader bar 93, and serve to brace the columns in their lower areas against deflection and provide a rigid unitary frame at each side of the machine, fitting closely between and having bearing engagement with the uprights 84 for vertical sliding movements relative thereto actuated by the air cylinders 100.

The column members 115 are connected across the roof assembly fixture by rigid I-beam cross members 122 which are deepest at their mid-position between the columns, each having a horizontal upper surface and the under side tapering upwardly from the mid-position to respectively opposite ends, where the beam is provided with end attaching plates 123 integrally welded thereto for securing it to the respective columns 115. The I-beams 122 are bolted through the end plates 123 directly to the web of the innermost channel 115 of each column, whereby to provide rigid connections across the jig fixture between the columns at opposite sides and defining a rectangular frame structure bridging the fixture and connecting the wheeled carriages at opposite sides of the jig, and comprised of the columns 115 connected at each side by the beams 118 and angle members 121 and the beams 122 connecting these assemblies across the jig. This structure provides a rigid, unitary frame of generally rectangular form adapted to bridge the roof fixture and be supported in the wheeled carriages at respective sides thereof, and movable vertically relative to the carriages guided between the uprights 84 in the longitudinal direction and between the base frame members 80 in the transverse direction. The rectangular frame and the carriages thus comprise a mobile unit, traveling as such with respect to the fixture.

Provision is made for keeping the rectangular frame portion in square with the carriage frame members and to insure equalization in the vertical movement of the frame at all four positions of the columns 115, and thus maintain the frame perfectly level at all times. At each side of the machine, as shown in Fig. 1, the columns 115 are each provided with a bearing 124 mounted upon the respective outer faces of the columns, and a shaft 125 extends continuously between and is rotatively mounted in the bearings and extends respectively beyond each of them into overlapping relation with the outer flange of the adjacent upright 84. A gear 126 is fixed to each end of the shaft where it projects beyond the respective bearings, and which operatively engage racks 127 fixedly mounted on the outer flange of the respective uprights. Thus, with an equalizer shaft assembly of this nature at each side of the machine, each column 115 is caused to move vertically at the same speed and in the same amount as the other column at that side. It will readily be seen that with the equalizer shaft 125 at each side rotatively mounted on the vertically movable frame portion, and gear connected with the supporting carriage assemblies, any vertical movement is communicated equally to both columns.

Shaft 125 provides for equalization longitudinally, but a similar arrangement provides for equalization transversely. An equalizer shaft 130, rotatively mounted in bearings 129 secured to the columns 115 at one end of the machine, as best shown in Fig. 12, extends transversely of the machine continuously between and beyond the respective bearings at opposite sides of the machine, into overlapping relationship with the upright channels 84. The shaft has a gear 131 fixed to each projecting end portion for operative engagement with a rack 132 fixed on the respective uprights at opposite sides of the machine. Thus it will readily be seen that with the equalizer shaft 130 also rotatively mounted on the vertically movable frame structure, and having gear connections at opposite ends with the carriage uprights 84, any vertical movement is communicated equally to both sides of the frame to insure vertical movements in the same amounts and at the same speeds at opposite sides, whereby, in combination with the equalizer shaft mechanism 125 at each side, to create equal vertical movements of all four columns and maintain a level condition of the frame at all times.

The vertically movable frame is interlocked with the carriage uprights 84 at each of the four corners, as best illustrated in Fig. 12, by means of flanged metal blocks 128 disposed between the opposed flanges of the channels 115 of the respective columns and bolted to the web of the associated channel upright 84, and which supplements the interengagement of the columns between the base frame members 80 to prevent any lateral movement between the frame and carriage assembly. As seen in this figure, bearing pads 113 are welded to each of the outer flanges of the column members 115 for sliding contact with the opposed face of the upright 84 in the confinement of the frame for guided vertical movement.

The vertically movable frame structure is provided with air pressure actuated indexing stops for operative cooperation with the stop blocks 70 at each side of the roof fixture for locking the frame precisely in proper relation to the roof seam to be welded. For this purpose, a heavy metal guide block 141 (Figs. 13 and 14) is mounted in each of the horizontal beams 118 for guiding a wedge block 140 which is reciprocable horizontally therethrough for interlocking engagement with the stop block 70 on the fixture. The guide block is supported upon the bottom cover plate 120 of the connecting beam and extends through openings provided therefor in the opposed channels 118 and is secured in position by welding. The guide block has an opening 142 through which the wedge block 140 extends, and which bears directly upon the plate 120 for support. The wedge block is projected into engagement with the stop block 70 and retracted therefrom by means of a horizontally operating air cylinder 143 mounted by means of a bracket 144 from the beam 118. In the operation of this machine as it travels relative to the roof fixture, the wedge block 110 on the carriage is first engaged with the stop block 65 on the base of the fixture to stop the carriage and lock it at each successive position of welding operations. The wedge block 140 then is projected into locking engagement with the stop block 70 to position and lock the frame in exact position to locate a welding head, carried by the frame, in alignment with the seam to be welded.

The carriage is self-propelled by means of an electric motor 145 driving through a gear reduction 146, a sprocket shaft 147, and having an air actuated clutch 148 for engaging and disengaging the motor drive from the shaft for starting and stopping the travel of the machine. The motor and driving shaft are mounted on brackets 149 on the upright portions of the carriage, at one end of the carriage, and each of which is braced by a gusset plate 150—the bracket supporting the motor and gear mechanism being further braced by the plate 86. The driving shaft rotates in bearing brackets 151 supported on the respective brackets, and is equipped with sprockets 152 at opposite ends for driving through chains 153, sprockets 154 operatively mounted with respect to one pair of the wheels 83 whereby the carriage may be propelled on the rails 26. The driving mechanism is mounted at an upper level of the carriage on the upright structures, and the drive chains extend downwardly through the uprights for driving connection with the wheels.

The cross beams, 122, connecting the columns 115 at opposite sides of the carriage, support hold-down clamping bars for applying pressure to adjoining roof sheets adjacent to the weld position during welding operations, and which are actuated by air, both in the application of pressure to the roof sheets and in the operation of releasing them from the roof. The hold-down bars are of aluminum, and non-magnetic, to eliminate stray magnetic pull in the area of the welding operations and thus insure more uniform welding results. The hold-down bars are shown in their applied and released positions in Figs. 2 and 3, respectively. The bars 155 are disposed at right angles to the beams 122, from which they are suspended, and are mounted one after the other in closely adjacent relationship throughout the full width of the roof area on the machine. The bars each engage the roof sheets at five points in their applied or hold-down position. At the end remote from the welding position, the bars engage the roof sheets at 156 adjacent their edges, and in spaced relation thereto at 157. At the mid-portion of the roof sheets, engagement is had at respectively opposite sides of the corrugation 15, as at 158, and at the welding position, the bars are each provided with a copper foot 159 for engagement with the edges of the roof sheets at respectively opposite sides of the seam to be welded, for holding the sheet edges down in pressure contact with the copper backing bars 41 and the carlines 13, for welding.

Figure 4:
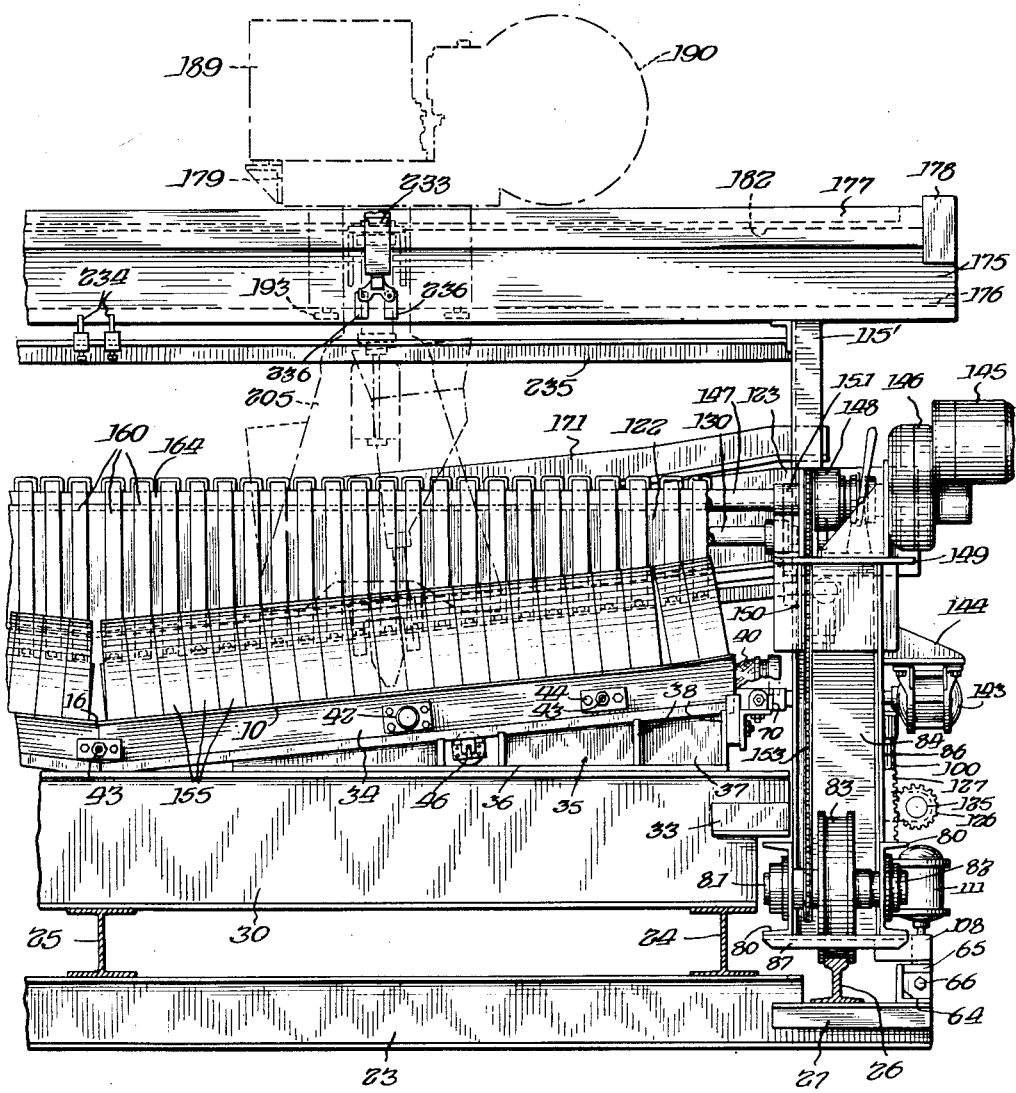
Fig. 4 is a general end elevational view of the welding machine showing the gantry type structure of the arrangement mounted upon wheels for travel relative to the jig fixture, which it straddles, and having a power drive mechanism for self propelled movement, and illustrating the pressure bars engaging the roof sheets and the manner of supporting them from a cross beam of the gantry.

As best shown in Figs. 4 and 7, the hold-down roof clamping bars 155 are each suspended from one of the cross beams 122 by means of a saddle 160 comprised of an inverted channel member at the top, extending across the supporting beam, and a depending leg at each side of the beam welded between the flanges of the channel and extending downwardly at each side of the member 122 for attachment to the hold-down bar through flanged feet secured by bolts. The saddles closely embrace the supporting beam at the sides for controlling the positions of the hold-down bars relative to the roof sheets and in respect to the welding seam. Clamping pressure is applied to all of the hold-down bars by means of an air hose 161 (Figs. 3 and 9) disposed between the upper surfaces of the bars and the under surface of the respective beams 122, whereby, when inflated, to exert full pressure on each of the bars to press all of them downwardly to apply the necessary welding pressure on the roof sheets. It is to resist the reaction of this applied pressure that the overhanging interlock 32—112 (Fig. 14) is provided between the jig fixture and the carriage. The air hose 161 is mounted between depending plates 162, welded edgewise to the bottom surface of each beam 122, which confine the hose within limits and also act as a limit of movement upwardly for the hold-down bars 155 when they are released.

When the air pressure is reduced in the hose 161 to release the clamping pressure of the bars on the roof sheets, pressure is built up in an air hose 163 mounted upon the upper surface of each of the beams 122 and extending beneath all of the upper cross pieces of the saddles 160 to lift the hold-down bars clear of the roof sheets when the hose is expanded under pressure. An inverted channel member 164 is mounted over the air hose 163 and beneath the saddles 160 to protect the hose from the edge flanges of the top cross pieces of the saddles, and which acts to lift all of the saddles, with their attached bars, simultaneously from the respective roof sheets. A pair of guide brackets 165 is mounted upon the top surface of each of the cross beams 122 for interengagement with the end saddles of each group. These upstanding brackets fit within the inverted channel-shaped cross piece of the respective end saddles to maintain the position of the hold-down members supported thereby relative to the roof sheets, and serve to confine the entire group of hold-down bars therebetween within the width of the roof being assembled on the fixture.

The hold-down clamping bars are actuated to exert pressure on the roof sheets after the movable carriage frame has been stopped and indexed with respect to each weld position. The carriage moves relatively to the roof assembly fixture only when the vertically movable rectangular frame portion is in its raised position, which maintains all of the hold-down bars in the raised inoperative position clear of the roof, illustrated in Fig. 3. In practice, the traveling carriage, with the vertically movable frame in raised position, progresses from one welding position after a weld has been completed, to the next position, where it is stopped by the indexing device 110, and locked. The vertically movable frame portion is lowered, and the indexing device 140 then interlocks with the jig fixture for alignment with respect to the weld position. The hold-down clamps are then applied to the roof sheets under pressure of the air hose 161. The weld is performed, after which the clamping pressure on the roof is released to permit lifting of the hold-down bars from the roof by the air hose 163, whereupon the index device 140 is released, the frame raised, and the index device 110 released to permit the machine to travel to the next succeeding position.

When the vertically movable frame portion is lowered, it is locked with respect to the carriage against relative vertical movement by the locking hooks 99 shown in Fig. 11. The locking and unlocking of these hooks and the vertical movements of the frame portion in raising and lowering during the various phases of operation, are actuated by the air cylinder 100, with its attached spreader bar, at each side of the machine. When the vertically movable frame portion is to be raised, air pressure is built up in the cylinders 100, which forces the spreader bars 93 downwardly, pivoting the hooks 99 about the respective pivot mountings 92 by reason of the connections 98, thereby releasing the hooks from locking engagement with the lock bars 117 and throwing them inwardly between the inner flanges of the column channels 115. Downward movement of the spreader bars continues until contact is had between the feet 95 thereof with the underlying supports 91 on the base plate assemblies 88, whereupon the reaction of the cylinders is upwardly, against the underside of the horizontal beams 118 connecting the columns 115, to raise the movable frame portion, with all its appurtenances, clear of the roof assembly.

When the vertically movable frame portion is to be lowered, the air is exhausted from the lifting cylinders, which permits the columns 115 to descend into supporting contact on the base plate assemblies 88, and with the continued exhaust of air from the cylinders, the spreader bars are caused to rise, thus swinging the hooks 99, by reason of the connections 98 therebetween, into locking engagement with the lock bars 117 in the four columns, whereby to prevent any relative vertical movement between the supporting wheeled carriage and the otherwise vertically movable frame. This locked relationship is maintained during the operation of welding, and is released for movement of the machine between welding positions. It will be noted, as shown Fig. 1, that the air cylinders 100 are located closer to the left hand end of the machine. This is done as a means of equalizing or balancing the weight of the vertically movable frame, since the greater weight thereon is disposed largely to the left side, as will hereinafter appear.

A box section beam, 170 (Figs. 1, 2, 9 and 10), comprised of two channels welded together flange to flange, extends across the machine and is secured to the inner faces of the column members 115 at the left hand side of the machine. This beam is sloped toward the center, having its lowest point midway between the columns at opposite sides of the machine and sloping upwardly therefrom toward opposite sides, following somewhat generally the contour of the roof sheets. The beam 170 is rigid with the vertically movable frame portion of the machine, and supports and guides a mounting assembly for the welding head which performs all of the welding operations. The beam has an angle member 171 mounted upon its upper surface having an upstanding flange flush with the inner face of the beam. The respective outer ends of the angle member are each mounted upon a block 172, spacing the ends above the beam to which the angle and including the blocks, are preferably secured by bolts. A guide angle 173 (Fig. 9) is bolted to the face of the beam and has an outstanding horizontal flange following the pitch contour of the roof 10. A depending extension plate 174 is welded edgewise to the bottom surface of the beam, flush with the inner face, and serves to increase the area of the face of the beam to that extent, and which acts as a roller guide bearing surface, as presently will appear.

The vertical columns at the left hand side of the vertically movable frame differ from those at the right hand side in that the inside channel members 115 of each column are extended upwardly, as at 115' to provide means of supporting a top horizontal beam 175 upon which the carriage for actuating the welding head in its traversal of the roof assembly jig fixture is mounted for driving movement across the machine in performing the welding operation. The beam is secured to the inner flanges of the channel extensions 115' and extends continuously across the machine and beyond the respective supporting channels. A roller bearing track 176 is provided on the inner face of the beam adjacent the lower edge, and a carriage supporting track 177 is secured to the rear face of the beam and extends above the upper surface of the beam. Carriage stop plates 178 are secured to the inner face of the beam at respectively opposite ends and projecting above the top surface of the beam for engagement with the carriage, to limit its travel in opposite directions.

The drive carriage 179 is supported upon the track 177 on rollers 180, and is driven by means of a gear 181 in constant mesh with a rack 182 extending continuously across the track on its inside face. A back-up roller 183 (Fig. 9), rotatably mounted on the carriage, engages the outside face of the track to maintain the driving gear in mesh with the rack. The carriage has a depending flanged wall 192 in front of the inner face of the beam 175, and which is equipped with rollers 193 mounted adjacent the lower edge thereof and engaging the bearing surface 176 on the face of the beam to support the carriage against any tendency to fulcrum about the supporting beam under the weight of loads applied at this side. The drive gear 181 has a friction drive engagement with a gear 184 disposed thereabove, and which is driven through suitable gear reduction mechanism by a motor 185 mounted on the carriage. The friction driving engagement between the gears is maintained by a spring 186 and is controlled by a release lever 187 pivoted on the carriage and actuated by an air cylinder 188, secured by a bracket to the carriage, to disengage the friction drive when it is necessary to stop the carriage or to engage the drive when propulsion of the carriage is required in accordance with the welding procedure. A welding control panel 189 is mounted upon the carriage, and a reel 190 carries a coil of electrode wire 191 with which the welding operations are effected.

The driving carriage 179 traverses substantially the full length of the supporting beam 175 in both directions across the full width of the roof assembly fixture, and is adapted to propel a welding head assembly 200 across the roof assembly in the performance of the welding procedure at each joint to be welded, and which may be formed with the head traveling in either direction. The head is propelled coincident with the carriage through the medium of a depending yoke member 199 rigidly attached to the carriage by means of bolts securing the upper portion of the yoke to the depending front wall 192, whereby to provide a downwardly extending arm on the carriage adapted to engage a welding head mounting assembly to impose every movement of the driving carriage in either direction on the welding head and its mounting. The lower portion of the yoke is provided with a vertically extending open guideway 198 wherein the mounting for the welding head is adapted to have engagement for impulsion thereby in either direction, traversing the roof assembly fixture, and within which the mounting moves vertically in accordance with the pitch of the roof as the welding operation proceeds across the roof.

The mounting for the welding head affords not only this vertical movement in accordance with the pitch of the roof as the head traverses the full width of the roof, but also provides for tilting of the head at the ridge position 16 in either direction, depending upon the direction of travel across the roof, and for pivoting of the head in directions transverse to the line of weld for guidance of the head in alignment with the seam to be welded. A mounting plate 205 is supported from the guide beam structure 170 and is movable vertically, guided within the yoke opening 198 and movable therewith across the fixture. This mounting plate is reinforced by vertical ribs 206 and top and bottom horizontal ribs 207 and 208 respectively, welded edgewise on its front face. The plate is supported from the beam structure 170 by means of a roller 209 rotatably mounted from the back surface of the plate and engaged upon the top surface of the horizontal flange of the guide angle 173, whereby to cause the mounting plate to move up and down in the yoke, following the contour of the roof as it travels thereacross. A bracket 210, welded to the back surface of the plate, extends over the upstanding flange of the angle 171 on the supporting beam, and mounts a roller 211 on its depending rear flange for rolling engagement with the rear surface of the upstanding flange 171 to maintain the mounting plate in an upright position and prevent its tipping under the weight of the welding head assembly and mounting parts secured thereto.

Maintenance of the mounting plate in a vertical plane is insured by a pair of rollers 212 mounted at opposite lower corners of the plate for bearing engagement with the face of the beam 170 and including the bottom extension plate 174. The rollers 212 engage the front face of the beam 170 to resist any tendency of the lower portion of the mounting plate to cant in this direction under the weight of the parts mounted thereon. The lower portion of the plate 205 is wider than the top portion, to provide a wider spread base for the rollers 212. The upper roller 211 and the wide spread lower pair of rollers 212 are all mounted upon shims 213 to provide for adjustment of the mounting plate with respect to the supporting angle 173 and parallel with respect to the yoke 199, and the three rollers provide a triangulated interlocking connection of the mounting plate with the supporting beam 170 to maintain the normal upright position of the plate and alignment of the roller 209 on the angle 173, and the interlocking, relatively movable relationship of the mounting plate with respect to the yoke.

The mounting plate is guided relative to the yoke by means of four rollers 214 mounted upon trunnions secured to the back surface of the plate by welding and extending into the guideway opening 198 of the yoke, with a pair of upper and lower rollers engaging each side of the guideway to maintain the vertical disposition of the mounting plate against tilting in directions parallel to the plane thereof. It is by means of these rollers 214, providing an interlocking relationship between the yoke and mounting plate, that coincident lateral movements are had of the welding head 200 with the driving carriage 179, and which permit relative vertical movements of the mounting plate with respect to the yoke while maintaining a propelling engagement therebetween for the lateral movements. The mounting plate 205 comprises the base member upon which all of the parts for tilting and pivoting of the welding head are mounted.

A slide plate 215 is mounted upon the plate 205 for vertical sliding movements relative thereto, and which is of generally inverted Y-shape in elevation. This slide plate has a separate back plate 216 secured thereto by welding, and having undercut vertical edges at the respectively opposite sides adapted to have interlocking engagement with vertical grooved guide runners 217 secured to the mounting plate 205 by socket head cap screws, and by means of which the slide plate is secured to the mounting plate for relative vertical sliding movements. The back plate 216 extends upwardly beyond the top of the plate 215 and is provided with a horizontal bracket 218 projecting over the top of the slide plate assembly. This bracket 218 provides for direct connection to the piston rod of an air cylinder 220 mounted above the mounting plate and slide plate assembly by means of a bracket 219 supporting the air cylinder from the face of the upper portion of the yoke 199, and thus from the carriage 179 on the beam 175.

This air cylinder is designed to balance the weight of the welding head and appurtenances to provide a more or less floating condition of the welding head adapted readily to follow the guiding arrangement provided for aligning it with the roof seam to be welded as it traverses the width of the roof. An inverted arcuate track member 221 is mounted on the top edge of the slide plate, as best shown in Figs. 8 and 9, and integrated therewith by welding to provide an overhanging downwardly presented arcuate track immediately adjacent to the face of the plate. An arcuate track member 222 is welded to the plate at the bottom edge and provides an upwardly presented arcuate track in opposed relation to the upper track. An arcuate guide bearing 223 is welded to the face of the slide plate in concentric spaced relation above the lower track. The radius of curvature of the upper and lower tracks and the bearing 223 is swung from the point of contact on the roof of the welding electrode 191, with the parts in the lowered welding position, for a purpose presently to appear.

The vertically movable slide plate 215 supports an arcuate slide plate 225 operatively mounted in the tracks 221 and 222 for sliding movement in a plane parallel to the first plate on the curvature swung about the weld point. This arcuate slide plate carries the welding head assembly 200, so that any movement thereof is reflected in the position of the welding head, and comprises the tilting means, through the medium of which the welding head and contained electrode are maintained perpendicular to the work by reason of the curvature of the supporting tracks being formed on the radius about the welding position. The plate 225 is mounted on rollers 226 running in the lower track 222, and a roller 227 mounted in the top of the plate, runs in the upper track 221. The arcuate slide plate is prevented from shifting laterally in the supporting tracks and maintained in vertical parallel alignment with the slide plate 215 by means of upper and lower pairs of guide rollers 228 rotatably mounted on the arcuate slide plate on axes disposed radially. The upper pair of guide rollers operate within the confines of the depending flanges on the upper track, while the lower guide rollers engage the arcuate bearing surface 223 under the applied load imposed by the weight of the welding head assembly.

The arcuate slide plate is actuated in either direction for tilting the welding head to one side or the other by means of a double acting air cylinder 230, the various positions of which are best illustrated in Figs. 6, 7 and 8, and which is pivotally mounted at one end to an extension bracket 231 welded to the base plate 205. The piston rod of the air cylinder is operatively connected to a laterally projecting lug 232 on the plate 225 at the side adjacent the cylinder for actuation of the plate thereby. The cylinder 230 operates during the travel of the welding head across the roof to actuate the arcuate slide plate to change the position of the head as it traverses the ridge position 16, functioning to tilt it to either side, depending upon the direction of travel, and is controlled by solenoid operated valve means energized by means of a switch actuated by the travel of the carriage across the fixture. The switch mechanism 233 (Fig. 10) is mounted on the carriage 179 and is actuated by tripping mechanism, including a pair of upstanding stops 234 mounted upon an angle member 235 extending continuously between and rigidly secured by welding to the upwardly extended columns 115' at opposite sides of the machine. The switch 233 has a double acting depending tripping arm, including a pair of single acting depending trip levers 236 pivotally mounted thereon, adapted respectively to engage the stops 234 in one direction for actuation and to ride over the respectively associated stops in the opposite direction. The levers 236 are each disposed in alignment with one of the stops 234 and are pivoted on the switch arm for movement in only one direction, but rigid against deflection in the other direction, so that as the carriage travels in one direction, one of the levers will engage one of the stops to trip the switch while the other lever rides over the other stop, and in the opposite direction, the other lever will engage the other stop to trip the switch while the first lever rides over its associated stop. Thus the switch 233 is actuated in either direction to energize the solenoid operating the valve controlling the air cylinder 230 to cause the cylinder to move the arcuate slide plate 225 to one side or the other whereby to tilt the welding head in the direction required directly as the electrode 191 reaches the ridge position 16, as determined by the adjustment of the stops 234 on the supporting angle 235.

The arcuate slide plate 225 carries the welding head 200 and supports it for relative pivoting movements in directions transverse to the line of travel as the weld progresses across the roof, which movement is guided in alignment with the weld as the head proceeds. The plate 225 is provided with outstanding brackets 238 and 239 rigidly secured thereto by welding and pivotally supporting a cradle 240 (Fig. 10), with the axis of the pivotal support disposed horizontal and parallel to the face of the plate whereby to permit of a swinging outwardly, away from the face of the plate. The welding head assembly is secured adjacent its upper portion to the cradle 240 by bolts for support, and the pivotal axis of the connections between the cradle and brackets, 238 and 239, is disposed in outwardly offset relation to the connection between the assembly and cradle but short of the center of gravity of the assembly, whereby to provide a natural tendency in the assembly to swing inwardly at the bottom toward the plate 225. This mounting provides for guiding the lower end of the welding head along a guide beam 245 in exact alignment with the seam to be welded. The guide beam is adjustable to a position in parallelism with the joint between the roof sheets, and is mounted at opposite ends in brackets 244 on the horizontal beams 118 at opposite sides of the vertically movable frame portion of the machine, as shown in Figs. 1 and 11. The brackets are manually adjustable by means of a handwheel to change the position of the beam 245 whereby to locate the beam in accordance with the path it is desired for the welding electrode to follow in performing the welding operation. The welding head is provided with a bracket 246 at the lower end portion adjacent to the electrode holder, and which supports a pair of rollers 247 disposed at respectively opposite sides of the holder on vertical axes. These rollers have rolling engagement with the guide beam 245 (Fig. 9) as the welding head progresses along the joint between adjoining roof sheets to maintain the electrode 191 positioned directly over the welding seam to be formed, and in perfect alignment with the joint.

The welding operation is performed by a submerged arc welding process, and the electrode 191 is fed into the weld at the same rate at which it is consumed in forming the bead connecting the roof sheets by feed mechanism driven by the motor 248 mounted on the welding head assembly, and this rate of feed may be varied or adjusted by the operators of the machine. A hopper 249, fixed to and movable with the head, feeds flux to the welding area as the weld progresses across the roof, and vacuum pick-up mechanism (not shown) is provided for taking up the excess flux behind the welding operation.

In the operation of this welding equipment, after the traveling machine has been indexed and locked in fixed relation to the fixture and the vertically movable frame portion of the carriage has been lowered and locked to the supporting base carriage structure and clamping pressure applied to adjoining roof sheets by the non-magnetic hold-down bars, the welding head is started at one side of the roof, as shown in Fig. 6, in alignment with the joint between the sheets and perpendicular to the slope of the sheets, to form the weld seam, and proceeds along the joint in the formation thereof, guided by the beam 245 and angle member 173 and balanced by the cylinder 220, to the ridge position 16, where it is tilted automatically to a position perpendicular to the slope of the roof sheets at this side of the roof, as shown in Fig. 7, by the action of the air cylinder 230 controlling the arcuate slide plate 225, and proceeds in the completion of the weld seam to the other side of the roof, as indicated in Fig. 5.

Suitable piping arrangements and controls are provided for actuation of all of the air operated mechanisms in the arrangement in the required sequences, and electrical connections and circuits are provided for these phases of the operations.

The arrangement described provides a welding apparatus designed for the fabrication of railway car roof structures at a high rate of production and upon which the setting up of the component roof sheets is facilitated for ready assembly in welding position and adapted progressively to weld each successive seam across the roof to an underlying carline member, with means for aligning and guiding the welding operation with a position centered with respect to the carline while following the contour of the roof sheets and while the adjoining roof sheets are held down against the carline. The machine has the capacity for completing a roof assembly in a minimum of time, and while a single traveling welding machine has been illustrated as associated with an adjoining pair of roof assembly jig fixtures, in actual practice two machines have been disposed for operation in conjunction with such fixtures and adapted both to work upon one roof assembly set up on one of the jig fixtures while another roof is being assembled on the associated fixture, whereby greatly to increase the capacity of the system to produce completed roof assemblies in providing for substantially continuous operation of the machines on adjoining fixtures. The fixtures incorporate carline supporting cradles which may be adjusted relatively to compensate for changes in dimension of the roof sheets due to the application of heat whereby the carlines may be maintained in respectively centered relation with respect to the joints between adjoining roof sheets. The welding machine incorporates a welding head pivotally mounted for free swinging movements in directions at right angles to the line of weld travel, whereby readily to be guided in alignment with the line of weld.

What is claimed is—

1. A production welding apparatus for railway box car roofs having transversely pitched portions including a rigid fixed base frame structure having longitudinally extending rails, a roof assembly fixture rigid with said base frame structure comprising upright supports extending above the level of said rails and adapted to mount a plurality of roof sheet panels in edge to edge longitudinal relation to provide successive transverse seams to be welded between adjoining panels, a welding machine movable longitudinally on said rails, a set of lower indexing devices for general positioning of the machine successively with respect to the seams to be welded comprising cooperating interfitting elements operatively connected respectively to the machine and said rails, a set of upper indexing devices for accurate positioning of the machine successively with respect to the seams to be welded comprising cooperating interfitting elements operatively connected respectively to said supports and machine, a welding head carrying a welding member making welding contact with a point on a seam when the elements of said sets of indexing devices are interfitted, means mounting said head on said machine for transverse reciprocation along said seams for successive welding operations thereon, said mounting means including transversely extending cooperating slide members carried by the machine and head respectively and curved arcuately about said welding contact point as a center, and means causing relative movement of said slide members so as to tilt the head transversely and thereby maintain right angularity of the welding member with said transversely pitched portions during welding operations.

2. A production welding apparatus for railway box car roofs including a rigid fixed base frame structure having longitudinally extending rails, a roof assembly fixture rigid with said base frame structure comprising upright supports extending above the level of said rails and adapted to mount a plurality of roof sheet panels in edge to edge longitudinal relation to provide successive transverse seams to be welded between adjoining panels, a welding machine movable longitudinally on said rails, a set of lower indexing devices for general positioning of the machine successively with respect to the seams to be welded comprising cooperating interfitting elements operatively connected respectively to the machine and said rails, a set of upper indexing devices for accurate positioning of the machine successively with respect to the seams to be welded comprising cooperating interfitting elements operatively connected respectively to said supports and machine, a welding head carrying a welding member making welding contact with a point on a seam when the elements of said sets of indexing devices are interfitted, and means mounting said head on said machine for transverse reciprocation along said seams for successive welding operations thereon.

3. A production welding apparatus for railway box car roofs including a rigid fixed base frame structure having longitudinally extending rails, a roof assembly fixture rigid with said base frame structure comprising upright supports extending above the level of said rails and adapted to mount a plurality of roof sheet panels in edge to edge longitudinal relation to provide successive transverse seams to be welded between adjoining panels, a welding machine movable longitudinally on said rails, a set of lower indexing devices for general positioning of the machine successively with respect to the seams to be welded comprising cooperating elements operatively connected respectively to the machine and said rails and vertically movable relatively to each other to interfitting locked relation, a set of upper indexing devices for accurate positioning of the machine successively with respect to the seams to be welded comprising cooperating elements operatively connected respectively to said supports and machine and horizontally movable relatively to each other to interfitting locked relation, a welding head carrying a welding member making welding contact with a point on a seam when the elements of said sets of indexing devices are interfitted, and means mounting said head on said machine for transverse reciprocation along said seams for successive welding operations thereon.

4. A production welding apparatus for railway box car roofs having transversely pitched portions including a rigid fixed base frame structure having longitudinally extending rails, a roof assembly fixture rigid with said base frame structure comprising supports adapted to mount a plurality of roof sheet panels in edge to edge longitudinal relation to provide successive transverse seams to be welded between adjoining panels, a welding machine movable longitudinally on said rails, indexing means for properly positioning the machine successively with respect to the seams to be welded, a welding head carrying a welding member making welding contact with a point on a seam when the machine is properly positioned by the indexing means, means mounting the head on the machine for transverse reciprocation along said seams for successive welding operations thereon, said mounting means including transversely extending cooperating slide members carried by the machine and head respectively and curved arcuately about said welding contact point as a center, and means causing relative movement of said slide members so as to tilt the head transversely and thereby maintain right angularity of the welding member with said transversely pitched portions during welding operations.

5. A production welding apparatus for railway box car roofs having transversely pitched portions including a roof assembly fixture for supporting a plurality of roof sheet panels extending across the fixture in adjoining edge to edge relationship throughout the length of the fixture to provide successive transverse seams to be welded between adjoining panels and including a welding machine mounted for traveling lengthwise relative to said fixture, indexing devices engageable between the fixture and the machine to position the machine successively with respect to each of said seams to be welded and lock the machine against movement relative to the fixture, a welding head having a welding member operatively juxtaposed to a point on one of said seams when the machine is locked relatively to the fixture, means mounting the welding head on the machine for reciprocation along said seams for welding operations thereon, said mounting means including transversely extending cooperating slide members carried by the machine and head respectively and curved arcuately about said point on a seam as a center, and means causing relative movement of said members so as to tilt the head transversely and thereby maintain right angularity of the welding member with said transversely pitched portions during welding operations.

6. A production welding apparatus for railway box car roofs having transversely pitched portions including a roof assembly fixture for supporting a plurality of roof sheet panels extending across the fixture in adjoining edge to edge relationship throughout the length of the fixture to provide successive transverse seams to be welded between adjoining panels and including a welding machine mounted for traveling lengthwise relative to said fixture, indexing devices engageable between the fixture and the machine to position the machine successively with respect to each of said seams to be welded and lock the machine against movement relative to the fixture, a welding head having a welding member operatively juxtaposed to a point on one of said seams when the machine is locked relatively to the fixture, means mounting the welding head on the machine for reciprocation along said seams for welding operations thereon, said mounting means including transversely extending cooperating slide members carried by the machine and head respectively and curved arcuately about said point on a seam as a center, means causing relative movement of said members so as to tilt the head transversely and thereby maintain right angularity of the welding member with said transversely pitched portions during welding operations, said head being mounted also for guided movement in directions at right angles to the direction of reciprocation thereof, and a guiding surface formed on the machine and engaged by the welding head mounting means for maintaining alignment of the welding member with the seam being welded during reciprocation of said head.

7. A production welding apparatus for railway box car roofs having transversely pitched portions including a roof assembly fixture for supporting a plurality of roof sheet panels extending across the fixture in adjoining edge to edge relationship throughout the length of the fixture to provide successive transverse seams to be welded between adjoining panels and including a welding machine mounted for traveling lengthwise relative to said fixture, indexing devices engageable between the fixture and the machine to position the machine successively with respect to each of said seams to be welded and lock the machine against movement relative to the fixture, a welding head having a welding member operatively juxtaposed to a point on one of said seams when the machine is locked relatively to the fixture, means mounting the welding head on the machine for reciprocation along said seams for welding operations thereon, said mounting means including transversely extending cooperating slide members carried by the machine and head respectively and curved arcuately about said point on a seam as a center, means causing relative movement of said members so as to tilt the head transversely and thereby maintain right angularity of the welding member with said transversely pitched portions during welding operations, said head being also pivotally mounted on the machine for guided movement in directions at right angles to the direction of reciprocation of the head, and a guiding surface formed on the machine and engaged by the welding head mounting means for maintaining alignment of the welding member with the seam being welded during reciprocation of said head.

8. The production welding apparatus claimed in claim 7, in which the pivotally mounted head is biased by its weight into engagement with the guiding surface formed on the machine.

9. The production welding apparatus claimed in claim 4, in which the means causing relative movement of the slide members for tilting the head transversely is a solenoid-controlled double acting air cylinder.

10. The production welding apparatus claimed in claim 4, in which the welding member is an electrode for arc welding, and in which the supports comprise a plurality of transversely extending parallel cradles separated by non-magnetic spacer members.

STEPHEN J. MATOSEC.

REFERENCES CITED

The following references are of record in the file of this patent:

UNITED STATES PATENTS

| Number | Name | Date |
|---|---|---|
| 1,487,043 | Youtsey | Mar. 18, 1924 |
| 1,668,783 | Rupley | May 8, 1928 |
| 1,751,077 | D'Ardenne | Mar. 18, 1930 |
| 1,838,899 | Arnold | Dec. 29, 1931 |
| 1,867,979 | Mayoh | July 19, 1932 |
| 1,872,114 | Burnish | Aug. 16, 1932 |
| 1,884,826 | Peck | Oct. 25, 1932 |
| 1,940,331 | Smith | Dec. 19, 1933 |
| 1,975,578 | Kenney | Oct. 2, 1934 |
| 2,191,476 | Hopkins | Feb. 27, 1940 |
| 2,221,187 | Gunn | Nov. 12, 1940 |
| 2,288,032 | Smith | June 30, 1942 |
| 2,403,221 | Howard | July 2, 1946 |

OTHER REFERENCES

Amer. Mach., Feb. 12, 1948, pp. 120-123.